United States Patent [19]

Cummings

[11] Patent Number: 5,049,705
[45] Date of Patent: Sep. 17, 1991

[54] PUSH BUTTON VACUUM-ELECTRIC AIR CONTROL DEVICE FOR AUTOMOTIVE VEHICLES

[75] Inventor: John G. Cummings, Cary, Ill.

[73] Assignee: Indak Manufacturing Corp., Northbrook, Ill.

[21] Appl. No.: 491,460

[22] Filed: Mar. 9, 1990

Related U.S. Application Data

[62] Division of Ser. No. 293,370, Jan. 4, 1989, Pat. No. 4,926,014.

[51] Int. Cl.$^5$ ............................................. H01H 15/00
[52] U.S. Cl. ....................................................... 200/16 C
[58] Field of Search ................ 200/16 R, 16 B, 16 C, 200/16 D, 16 E, 11 J

[56] References Cited

U.S. PATENT DOCUMENTS

| | | | |
|---|---|---|---|
| 2,840,650 | 6/1958 | Long | 200/16 C |
| 3,029,320 | 4/1962 | Laete | 200/16 C |
| 3,188,697 | 6/1965 | Schink | 200/16 C |
| 3,223,794 | 12/1965 | Hoy et al. | 200/16 C |
| 3,602,656 | 8/1971 | Graddy et al. | 200/16 C X |
| 4,126,153 | 11/1978 | Raab | 200/16 C X |

Primary Examiner—J. R. Scott
Attorney, Agent, or Firm—Burmeister, York, Palmatier & Zummer

[57] ABSTRACT

The disclosed control device includes an electrical switch having a switch body in which an electrically insulating switch carriage is manually movable along a predetermined path. Fixed electrical contacts are mounted on the body along such path and are selectively engageable by an electrically conductive contactor mounted on the carriage. The contactor takes the form of an angle-shaped plate consisting of first and second flanges in a rectangular relationship. The first flange has portions, preferably contact points, slidably engageable with the fixed contacts. The carriage has a guide slot for slidably receiving the second flange. A compression spring on the carriage produces contact pressure between the first flange and the fixed contacts. The second flange and the guide slot constitute the sole guide and support for the contactor, which is substantially flat except for the contact points. The flanges extend in a direction parallel to the path and have the same length in such direction. The second flange has a detent point projecting laterally into a guiding channel formed in a side wall of the guide slot. The detent point is detained in the guiding channel by a detent bar obstructing the entrance to the channel.

12 Claims, 21 Drawing Sheets

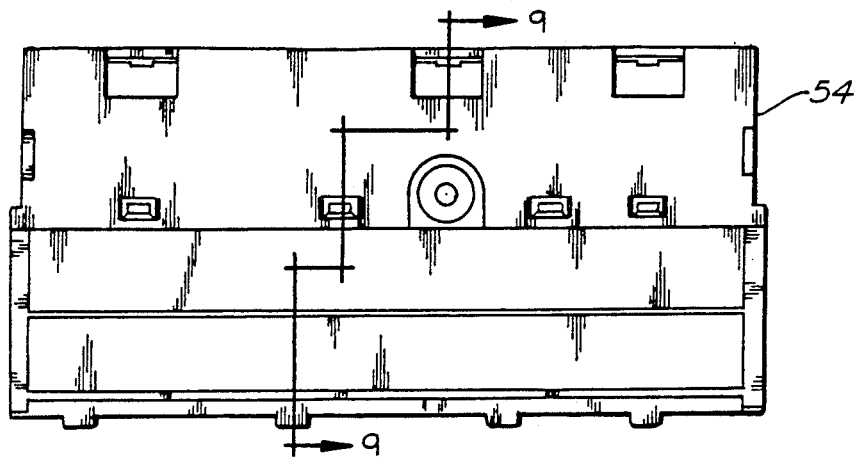
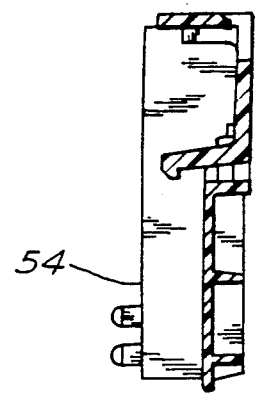
FIG. 8　　FIG. 9
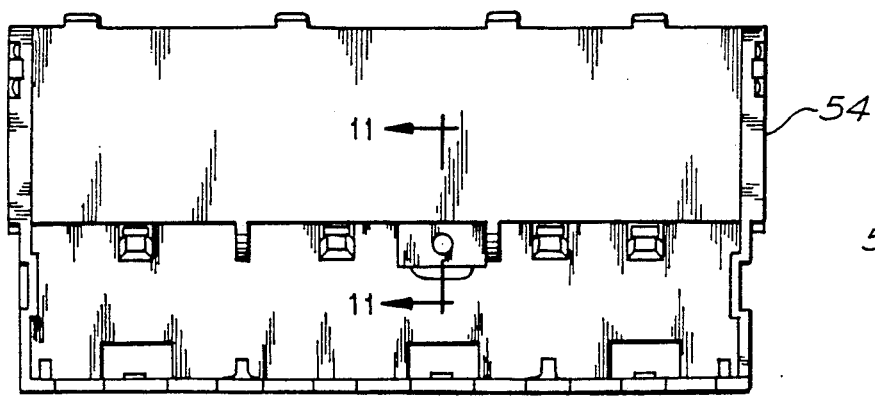
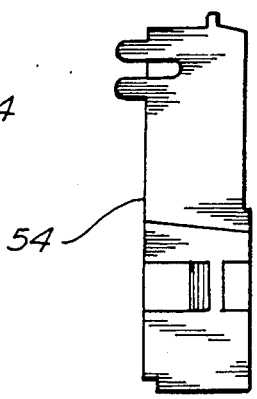
FIG. 7　　FIG. 10
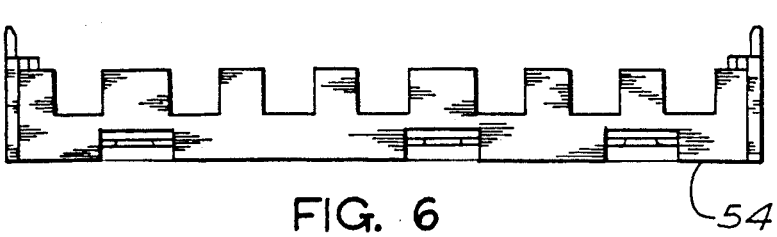
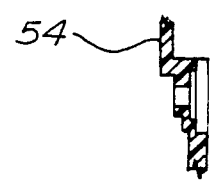
FIG. 6　　FIG. 11
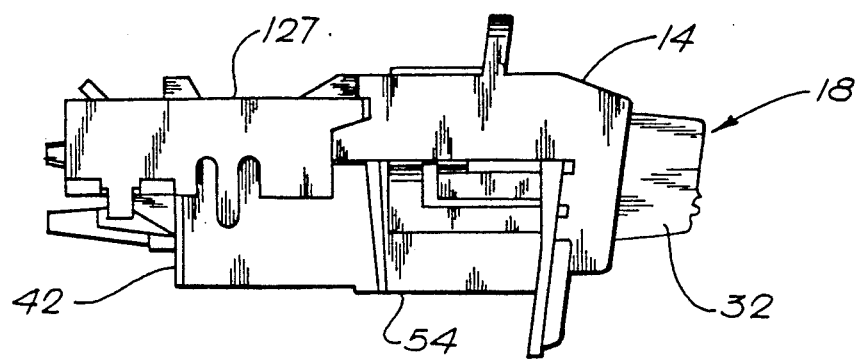
FIG. 5

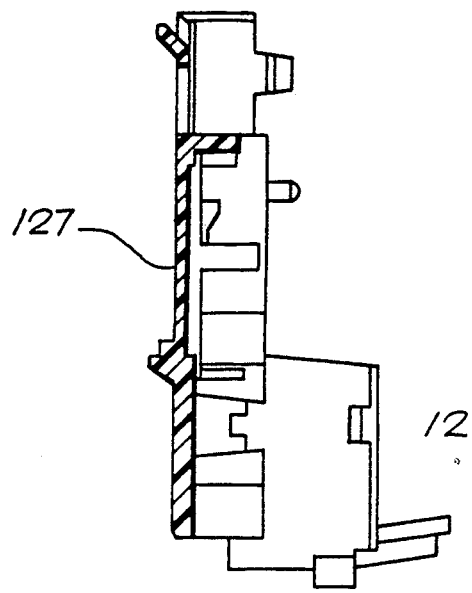
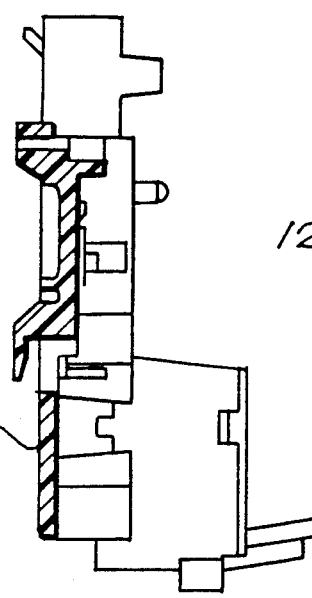
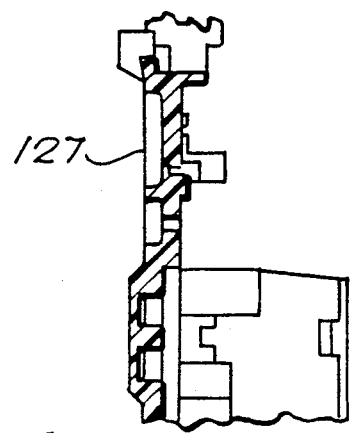
FIG. 32   FIG. 33   FIG. 34
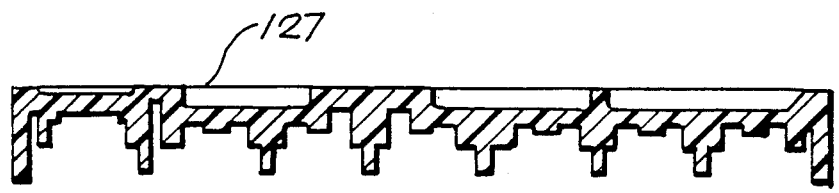
FIG. 31
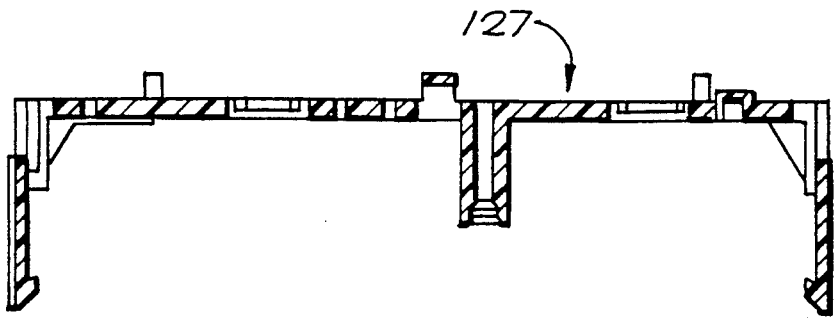
FIG. 30

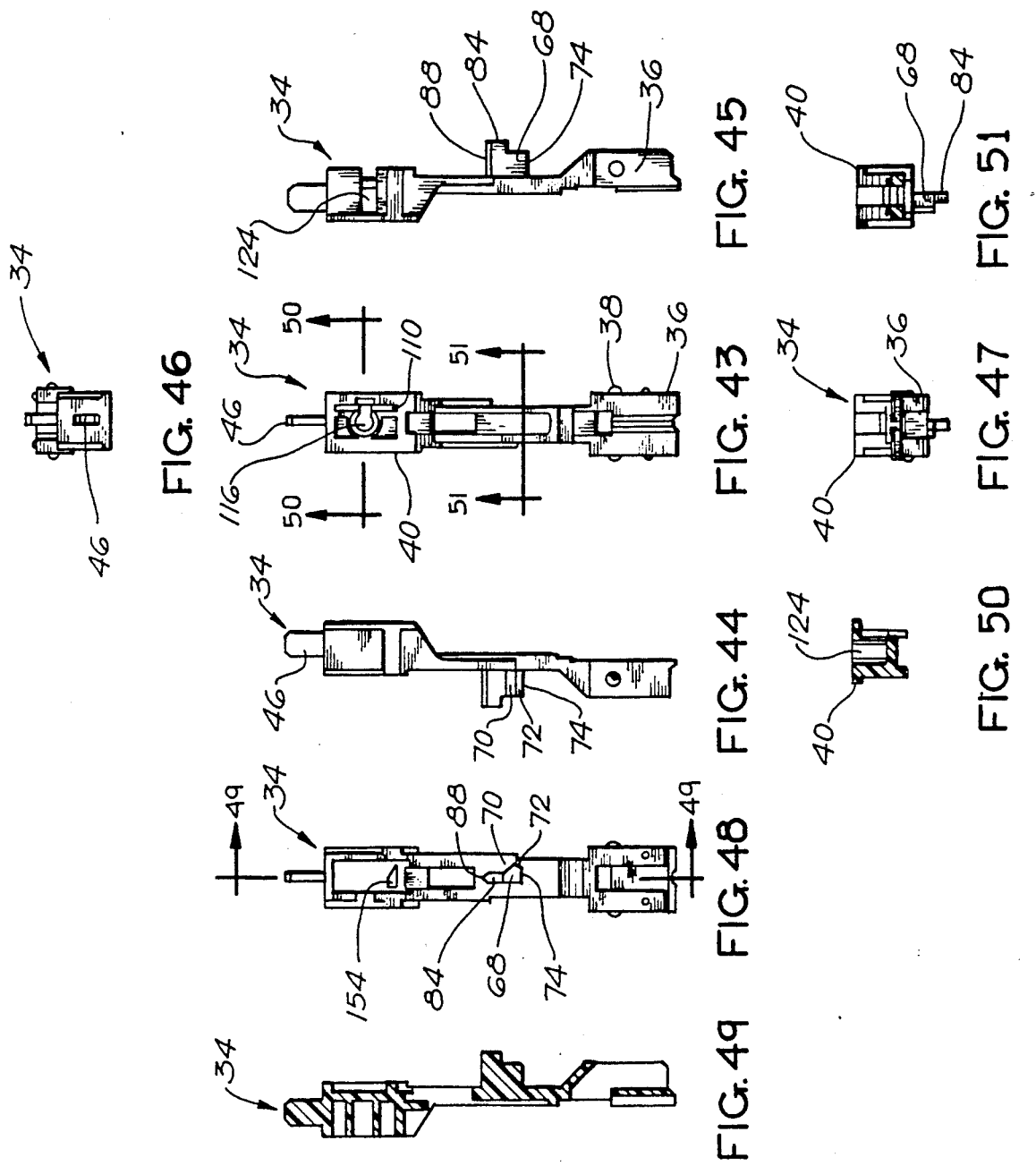

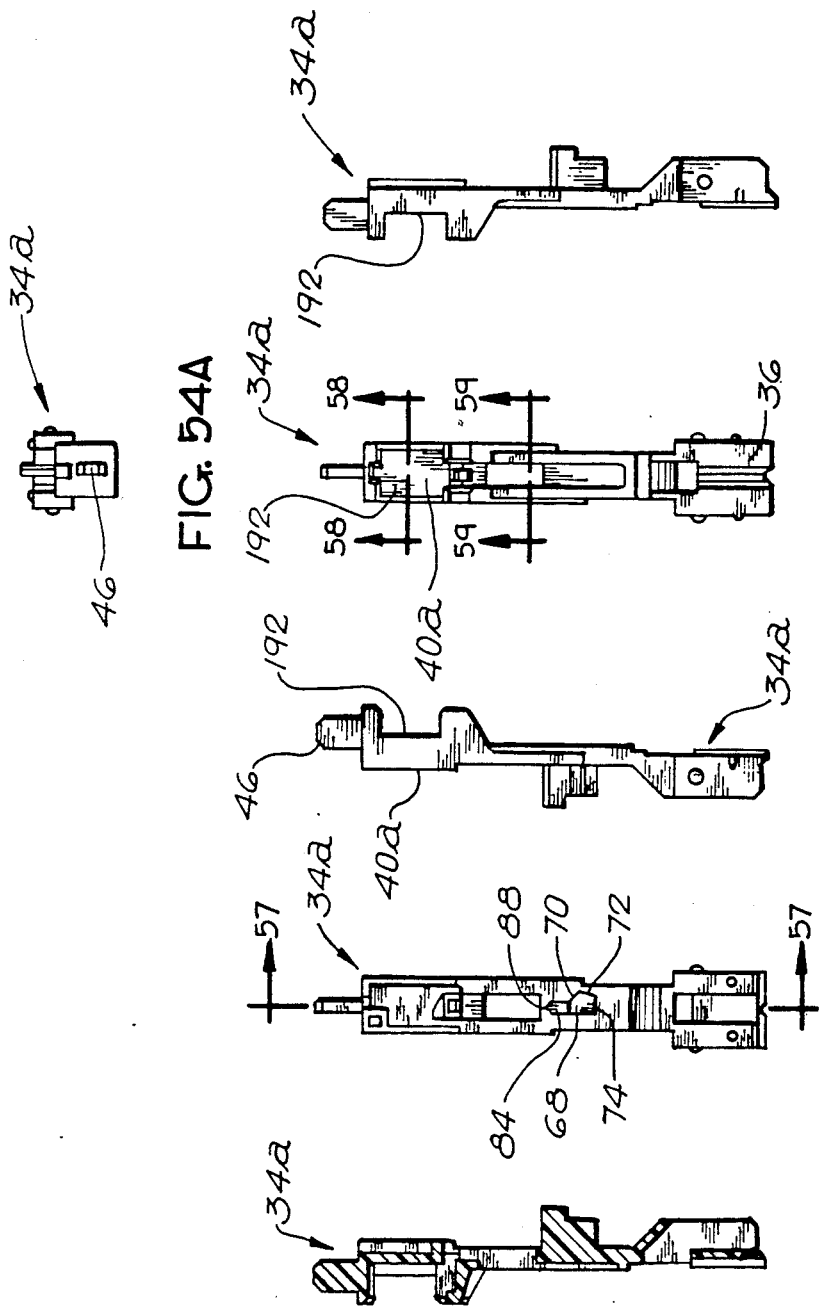

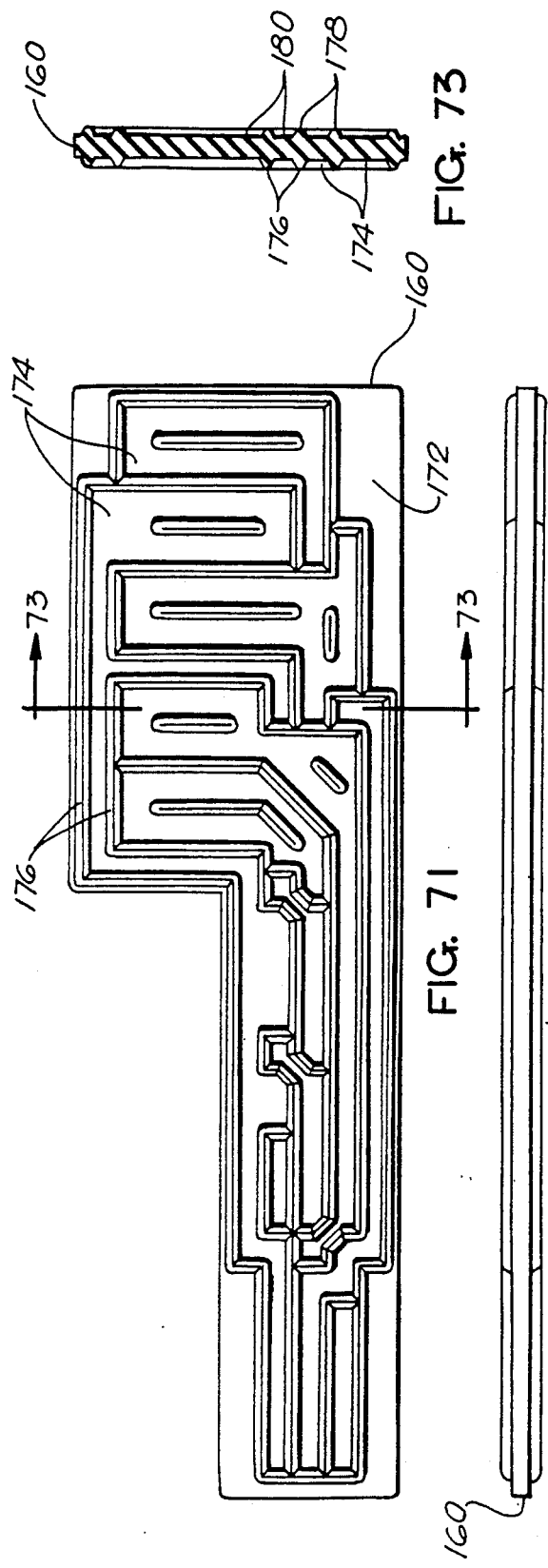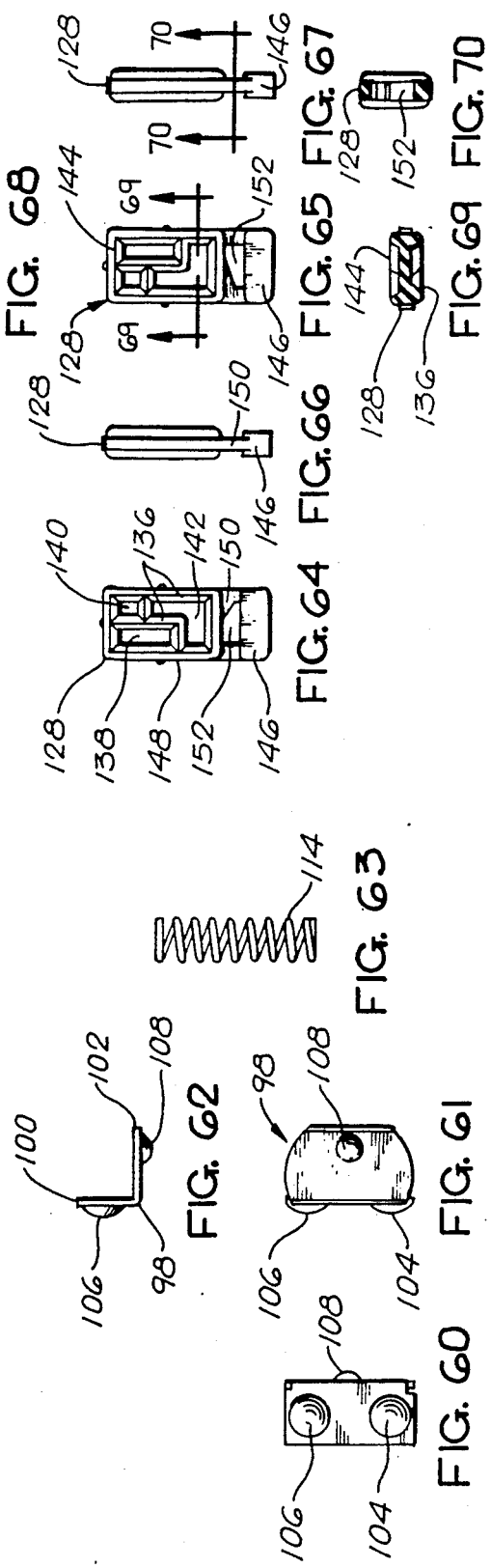

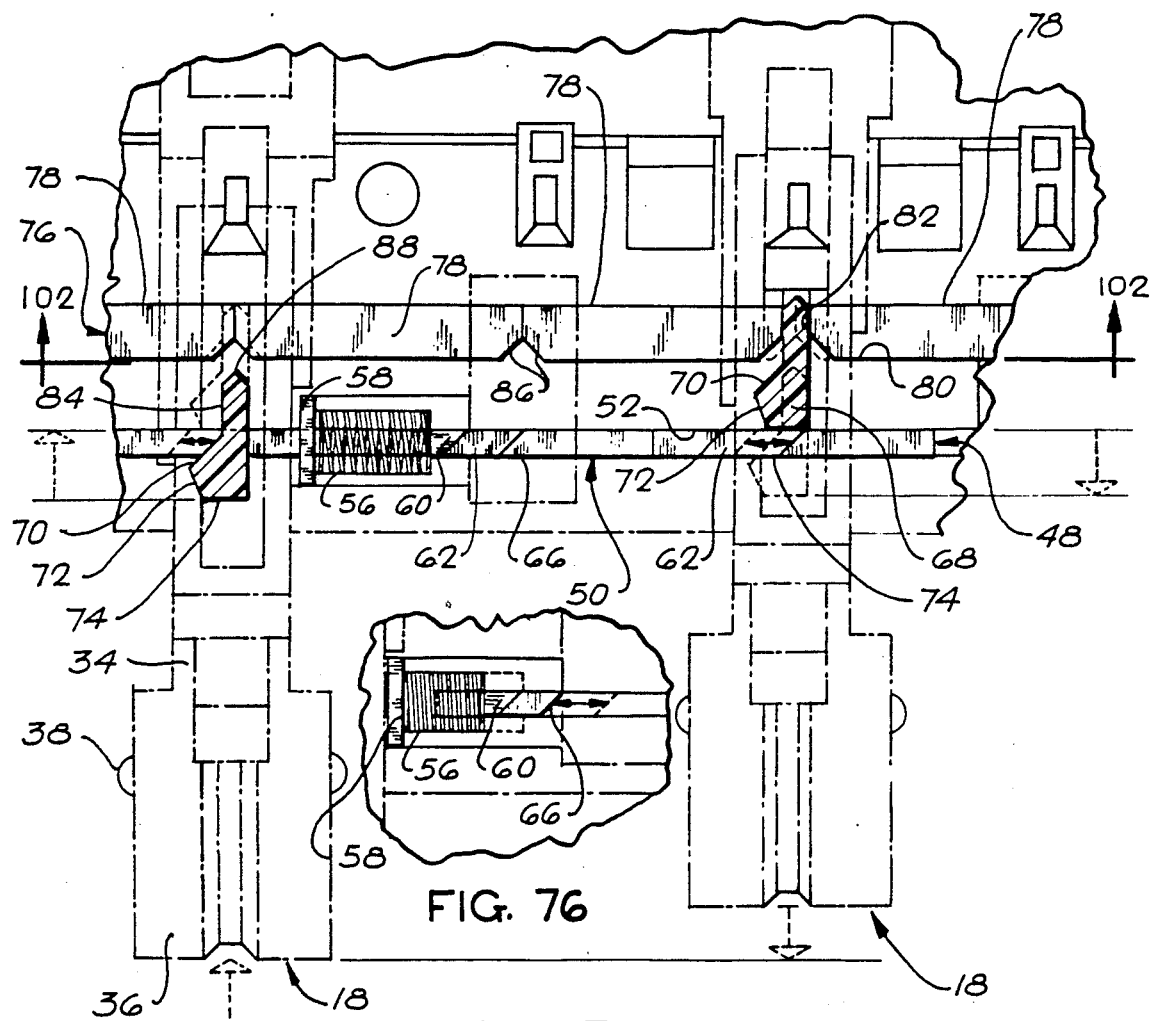
FIG. 76
FIG. 75
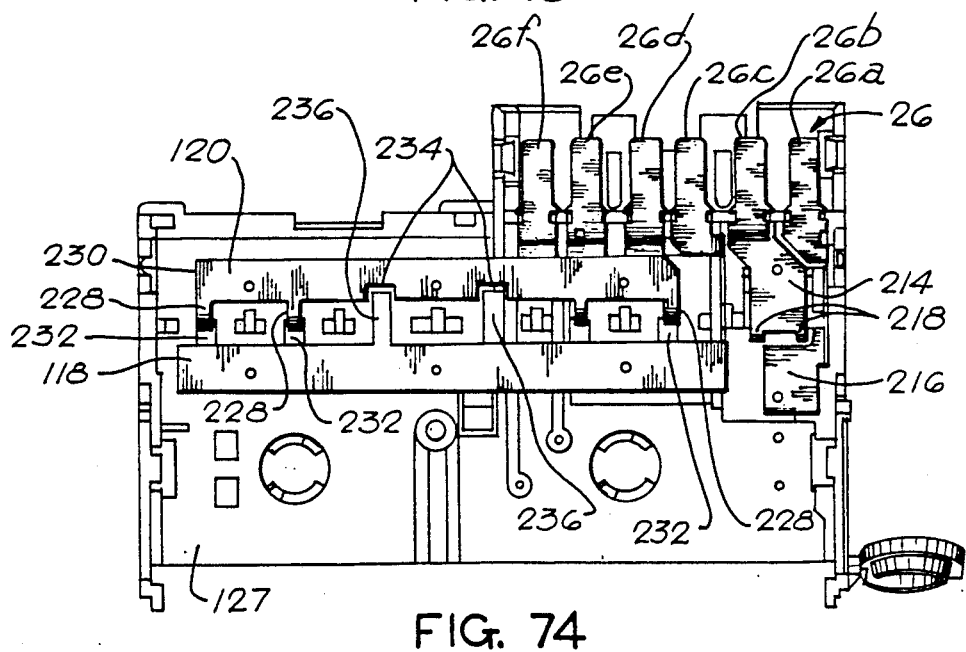
FIG. 74

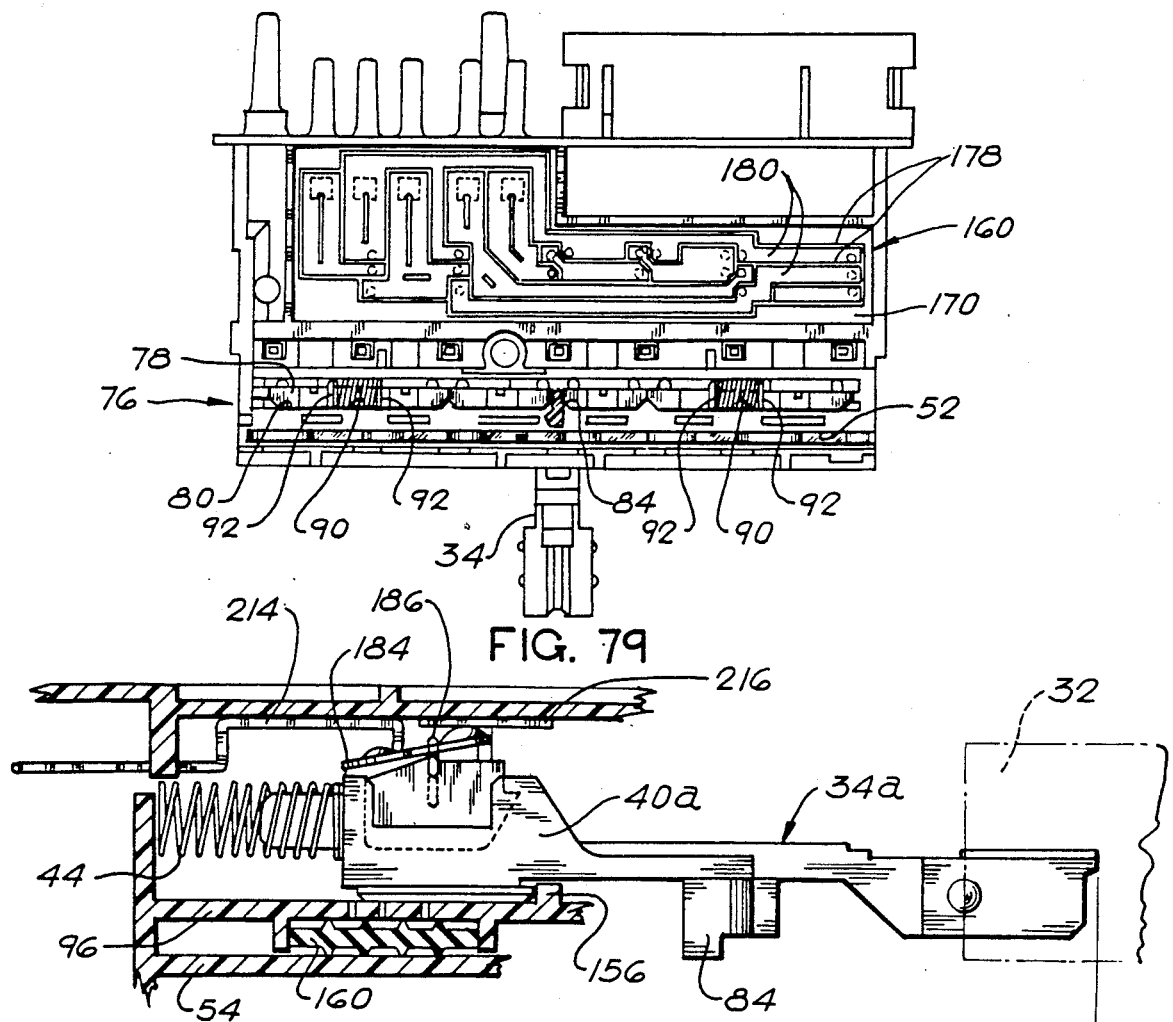
FIG. 79
FIG. 80
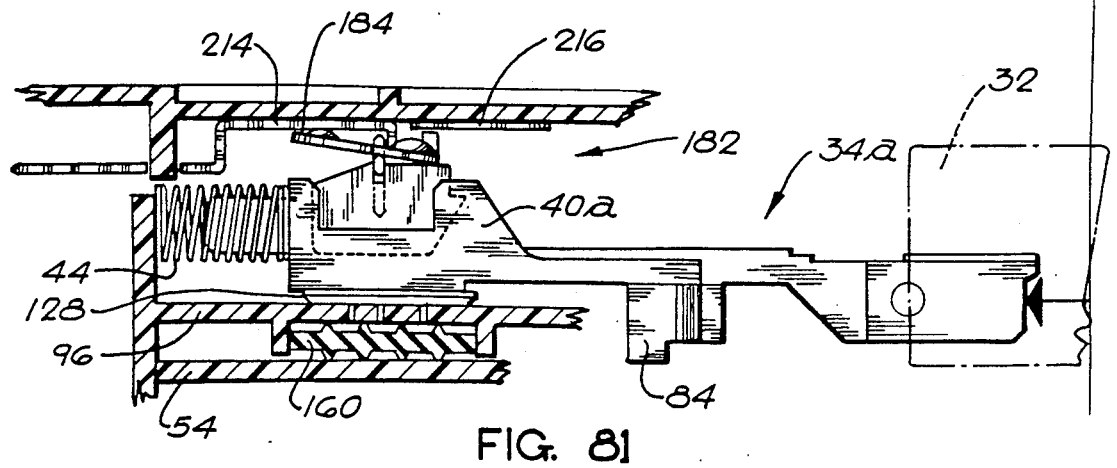
FIG. 81

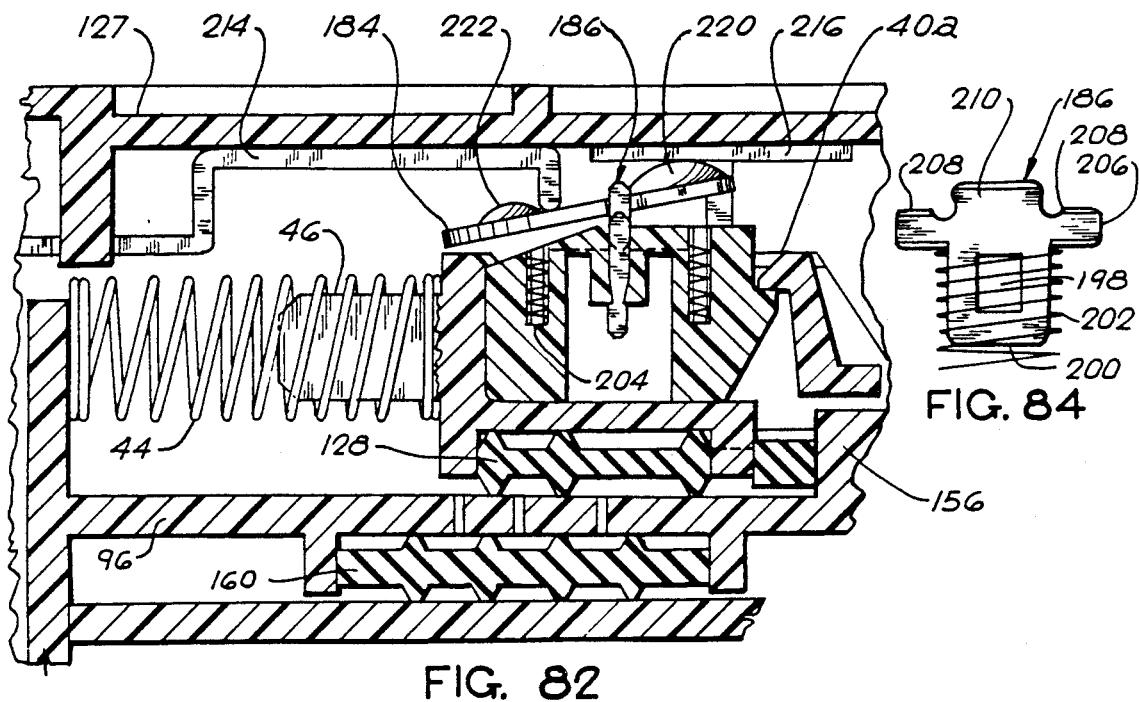
FIG. 82
FIG. 84
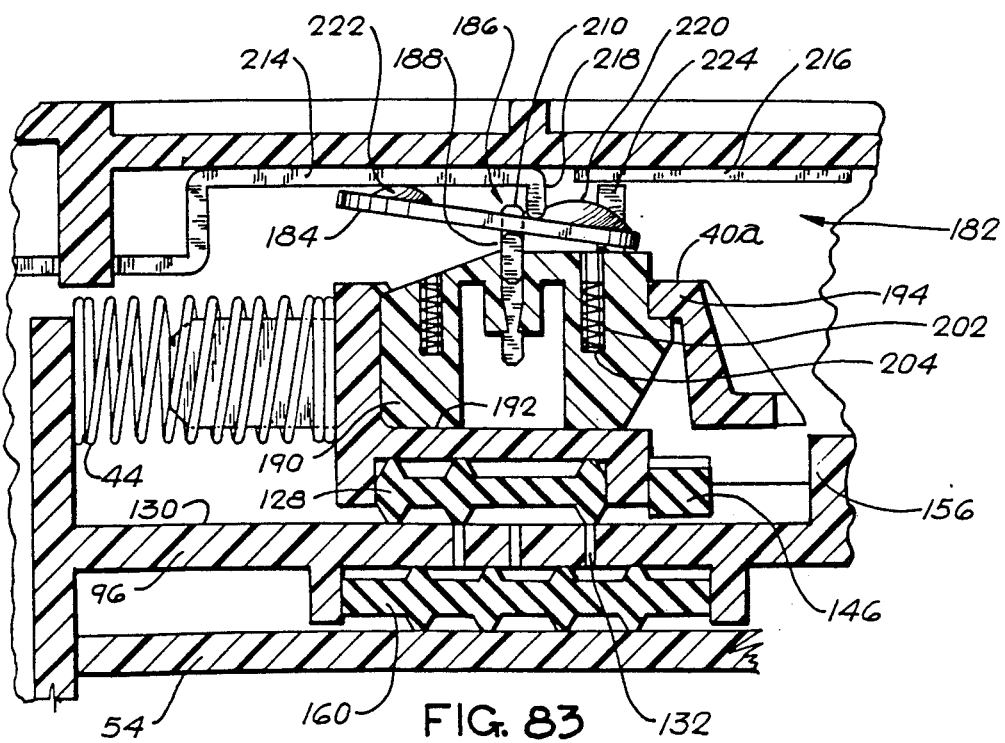
FIG. 83

PUSH BUTTON VACUUM-ELECTRIC AIR CONTROL DEVICE FOR AUTOMOTIVE VEHICLES

This application is a division of application Ser. No. 07/293,370, filed Jan. 4, 1989, now U.S. Pat. No. 4,926,014, issued May 15, 1990.

FIELD OF THE INVENTION

This invention relates to control devices or units for controlling the various functions of automotive heating, ventilating and air conditioning systems, also referred to herein as automotive air control systems. Such control units select various modes of operation, which may include heating, ventilation, maximum air conditioning, normal air conditioning, windshield defogging or defrosting, use of floor, panel and windshield air outlets, recirculation of inside air, intake of outside air, and OFF, for example. Various combinations of modes may be selected for simultaneous use. In some cases, some of the functions or modes may be omitted, particularly the air conditioning functions.

BACKGROUND OF THE INVENTION

A variety of vacuum-electric control units or devices have been employed for controlling automotive heating, ventilating and air conditioning systems. Control units of one type have employed a single movable function control member, such as a lever or slider, having a multiplicity of positions, corresponding with the desired functional modes of operation. The multiposition lever or slider may operate one or more multiposition vacuum control valves and one or more electrical switches. The switches may control the energization of a blower motor and an air conditioning clutch, whereby an air conditioning compressor is driven by the engine of the vehicle. The multiposition vacuum control valve may supply intake manifold vacuum to various vacuum motors for operating doors or valve plates in the air duct system, for controlling the movement of air to and from the desired locations in the system.

In addition to the function control member, there is often a heat control member, which may be in the form of a movable lever or slider, for regulating the amount of heat supplied by the system, and a multiposition blower speed control switch, for regulating the speed of the blower motor.

There are also control units of the push button type, having a series of push buttons for selecting the various operating functions or modes. In a prior construction of one type, the push buttons operate a complex mechanical selector mechanism, whereby each push button actuates selected control elements, which may include a selected vacuum control valve or a selected electrical switch, or both. The selector mechanism may utilize cam action selectors or linkage plate selectors. Such push button control units tend to be rather complex in construction.

Another type of prior construction has employed a plurality of push buttons, each of which operates a separate vacuum valve to accomplish a particular control function. Thus, for example, there may be four push buttons and four vacuum valves, each of which may be operated by one of the push buttons. The push buttons may latch down individually. In some cases, more than one push button may be operated simultaneously.

There has also been another type of prior construction which has employed a plurality of push buttons, each of which operates a separate electrical switch to accomplish a particular electrical control function. The push buttons may latch down individually.

SUMMARY OF THE INVENTION

One object of the present invention is to provide a new and improved push button vacuum-electric control device having several push buttons, each of which may operate a corresponding electrical switch, a corresponding vacuum valve, or both.

Another object is to provide a new and improved vacuum-electric control device of the foregoing character, in which each push button directly supports and operates and electrical contactor.

Another object is to provide a new and improved control device of the foregoing character which is relatively uncomplicated in construction, reliable in operation, and low in cost.

In accordance with the present invention, the control device comprises an electrical switch construction employed in connection with certain of the push buttons. In this electrical switch construction, a portion of each of the involved push buttons provides an electrically insulating switch carriage which is movable by the push button along a predetermined path on body means formed in the housing of the control device. Fixed electrical contact means are mounted on the body means along the predetermined path. An electrically conductive contactor is mounted on the carriage for selectively engaging the fixed contact means. The contactor takes the form of an angle-shaped plate consisting of first and second flanges with a generally rectangular relationship therebetween. The first flange has portions thereof slidably engageable with the fixed contact means. The carriage has a single slot therein for slidably receiving the second flange for sliding movement of the contactor toward the fixed contact means. A compression spring is compressed between the carriage and the contactor for biasing the first flange toward the fixed contact means and for producing spring contact pressure between the first flange and the fixed contact means. The second flange and the guide slot constitute the sole guiding and supporting means for the contactor.

Preferably, the compression spring comprises a coil spring compressed between the first flange and the carriage, which preferably has a spring nest therein for receiving and locating the coil spring. The second flange and the carriage preferably have detent means thereon for detaining the second flange in the slot to facilitate assembly of the control device, while providing for sliding movement of the second flange in the slot.

The second flange and the guide slot preferably extend in a direction which is substantially parallel with the direction of the predetermined path of the carriage.

The first and second flanges preferably have substantially the same length along the direction of such path.

The contacting portions of the first flange preferably take the form of a plurality of rounded contactor points projecting from the first flange toward the fixed contact means and slidably engageable therewith, the first flange being otherwise substantially flat.

The contactor points preferably comprise a pair of such points which are spaced apart along the direction of such path.

The second flange of the contactor preferably has a detent point projecting laterally therefrom, the guide slot having a side wall formed with a guiding channel for receiving and guiding the detent point, the guiding channel extending substantially perpendicular to the direction of such path, the side wall having a detent bar formation obstructing the entry of the detent point into the guiding channel while also obstructing the exit of the detent point out of the guiding channel for detaining the detent point in the guiding channel, the side wall and the detent bar formation being flexible and resilient to provide for entry of the detent point into the guiding channel.

BRIEF DESCRIPTION OF THE DRAWINGS

Further objects, advantages and features of the present invention will appear from the following description, taken with the accompanying drawings, in which:

FIG. 5 a side elevation of the control device.

FIG. 6 is front elevation of the bottom cover for the housing of the control device.

FIG. 7 is a top plan view of the bottom cover.

FIG. 8 is a bottom plan view of the lower cover.

FIG. 9 is a vertical section, taken generally along the broken line 9—9 in FIG. 8.

FIG. 10 is a side view of the bottom cover.

FIG. 11 is a fragmentary section, taken generally along the line 11—11 in FIG. 7.

FIG. 30 is a vertical section, taken generally along the line 30—30 in FIG. 24.

FIG. 31 is a vertical section, taken generally along the line 31—31 in FIG. 24.

FIG. 32 is a vertical section, taken generally along the line 32—32 in FIG. 24.

FIG. 33 is a vertical section, taken generally along the line 33—33 in FIG. 24.

FIG. 34 is a fragmentary vertical section, taken generally along the broken line 34—34 in FIG. 24.

FIG. 43 is a top plan view of one of the push button shafts for the control device.

FIG. 44 is a side elevation, showing one side of the push button shaft.

FIG. 45 is a side elevation, showing the opposite side of the push button shaft.

FIG. 46 is a rear elevation of the push button shaft.

FIG. 47 is a front elevation of the push button shaft.

FIG. 48 is a bottom plan view of the push button shaft.

FIG. 49 is a vertical section, taken generally along the line 49—49 in FIG. 48.

FIG. 50 is a vertical section, taken generally along the line 50—50 in FIG. 43.

FIG. 51 is a vertical section, taken generally along the line 51—51 in FIG. 43.

FIG. 52 is a top plan view of the OFF push button shaft for the control device.

FIG. 53 is a side elevation showing one side of the OFF push button shaft.

FIG. 54 is a side elevation, showing the opposite side of the OFF push button shaft.

FIG. 54A is a rear elevation of the OFF push button shaft.

FIG. 55 is a front elevation of the OFF push button shaft.

FIG. 56 is a bottom plan view of the OFF push button shaft.

FIG. 57 is a vertical section, taken generally along the line 57—57 in FIG. 56. FIG. 58 is a vertical section, taken generally along the line 58—58 in FIG. 52.

FIG. 59 is a vertical section, taken generally along the line 59—59 in FIG. 52.

FIG. 60 is a top plan view of an electrical contactor, six of which are employed on six of the seven push button shafts of the control device.

FIG. 61 is a side elevation of the contactor.

FIG. 62 is an end elevation of the contactor.

FIG. 63 is a side elevation of a contactor coil spring, six of which are employed on six of the seven push button shafts for the control device.

FIG. 64 is a bottom plan view showing the operative side of a typical silicone rubber valve member, seven of which may be employed in the control device.

FIG. 65 is a plan view showing the opposite side of the valve member.

FIGS. 66 and 67 are opposite edge views of the valve member.

FIG. 68 is an end view of the valve member.

FIG. 69 is a vertical section, taken generally along the line 69—69 in FIG. 65.

FIG. 70 is a vertical section, taken generally along the line 70—70 in FIG. 67.

FIG. 71 is an enlarged top plan view of a silicone rubber manifold for distribution of the vacuum in the control device, the bottom plan view being a mirror image.

FIG. 72 is a front elevation showing the front edge of the manifold.

FIG. 73 is a vertical section, taken generally along the line 73—73 in FIG. 71.

FIG. 74 is a bottom plan view of an assembly, comprising the top cover and the fixed electrical contact bars and terminals mounted thereon.

FIG. 75 is an enlarged diagrammatic plan view, partly in section, showing a partial assembly comprising the body member, two of the push button shafts, the latching bar with its biasing spring, and the lockout blocks which prevent more than one of the push buttons from being depressed simultaneously.

FIG. 76 is a fragmentary enlarged view, similar to a portion of FIG. 75, but showing the latching bar in a changed position in which it produces additional compression of its biasing spring.

FIG. 79 is a bottom plan view showing a partial assembly of the body member of the housing; the silicone rubber vacuum distribution manifold member; the lockout blocks with their takeup springs; and the latching bar for latching any particular push button in its depressed position.

FIG. 80 is a fragmentary enlarged vertical section, taken from front to rear along the OFF push button shaft, and also showing the associated return spring; the rockable OFF contactor in its ON position; the associated components for mounting the OFF contactor on the OFF push button shaft; the associated fixed contact members; the silicone rubber valve member on the push button shaft; the port member with vacuum ports therein; and the silicone rubber vacuum distribution member, the push button shaft being shown in its extended position.

FIG. 81 is a fragmentary vertical section, similar to FIG. 80, but showing the OFF push button shaft in its depressed position, so that the OFF contactor has been rocked to its OFF position.

FIG. 82 is a fragmentary greatly enlarged vertical section, similar to a portion of FIG. 80, but showing the OFF push button shaft in section, while also showing the OFF contactor carriage insert in section to reveal the single compression coil spring which biases the contactor fulcrum member upwardly, the OFF contactor being shown in its ON position.

FIG. 83 is a fragmentary greatly enlarged vertical section, similar to FIG. 82, but showing the OFF push button shaft in its depressed position, with the contactor rocked to its OFF position.

FIG. 84 is an enlarged elevation showing the fulcrum member for the OFF contactor.

DETAILED DESCRIPTION OF ILLUSTRATIVE EMBODIMENTS

Figure 1:
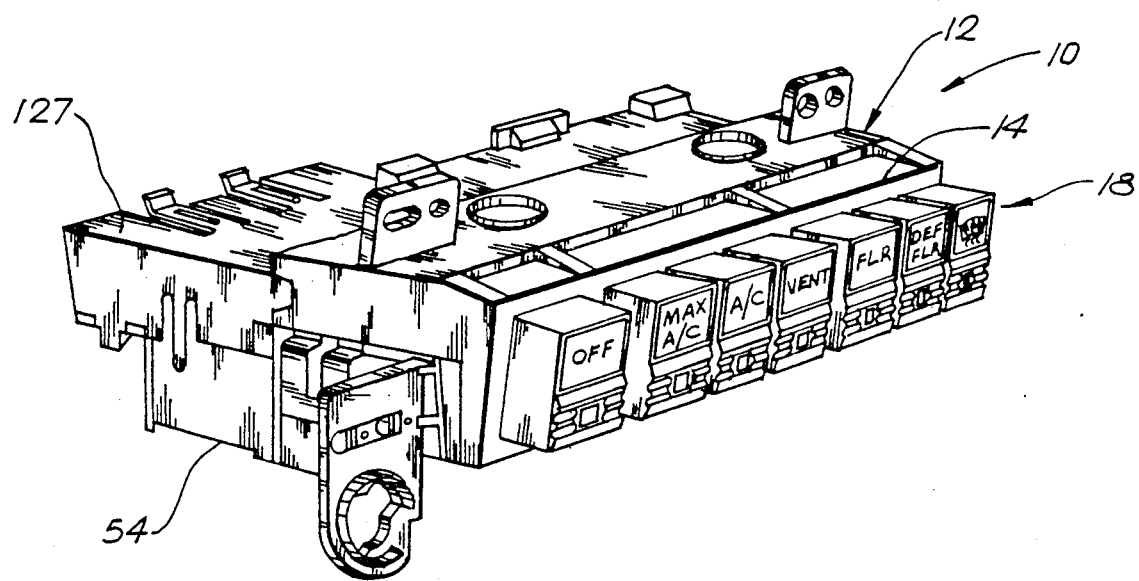
FIG. 1 is a front perspective view of a push button vacuum-electric air control device, to be described as an illustrative embodiment of the present invention.

As just indicated, FIGS. 1-5 illustrate the general appearance of an illustrative embodiment of the present invention in the form of a push button vacuum-electric air control device 10, which may find various applications, but is intended particularly for controlling the operation of an automotive heating, ventilating, and air conditioning system. The control device 10 is adapted to be inserted into a suitable opening in a control panel of an automobile, truck or other vehicle.

The control device 10 has a housing 12, preferably assembled from several parts molded from a suitable resinous plastic material. The housing 12 has a front bezel 14 with a plurality of guide openings 16 therein containing means 17 for guiding the rearward and forward sliding movement of a plurality of push buttons 18 which are adapted to be used to control all of the functions of the control device 10. The number and arrangement of the push buttons 18 may be varied in accordance with the needs of the system with which the control device 10 is to be used.

The illustrated control device 10 has seven push buttons 18a-18g, with markings thereon in the form of legends or symbols, to indicate the control functions assigned to the push buttons in the automotive heating, ventilating and air conditioning system. The markings on the push buttons are as follows: 18a, OFF; 18b, MAX A/C (maximum air conditioning); 18c, A/C (air conditioning); 18d, VENT; 18e, FLR (floor); 18f, DEF FLR (defog and floor); and 18g, the standard symbol indicating defrost.

The markings on the push buttons 18a-18g are displayed on translucent window panels 20 thereon which are back-lighted by light derived from an illuminating system including lamps and transparent plastic light bars (not shown). Each of the push buttons 18 also has an indicator jewel 22 which is not illuminated when the push button is extended, but is illuminated when the push button is depressed. The indicator jewels 22 may be in the form of small prismatic light bars which intercept light beams from the main light bars when the push buttons are depressed.

Figure 3:
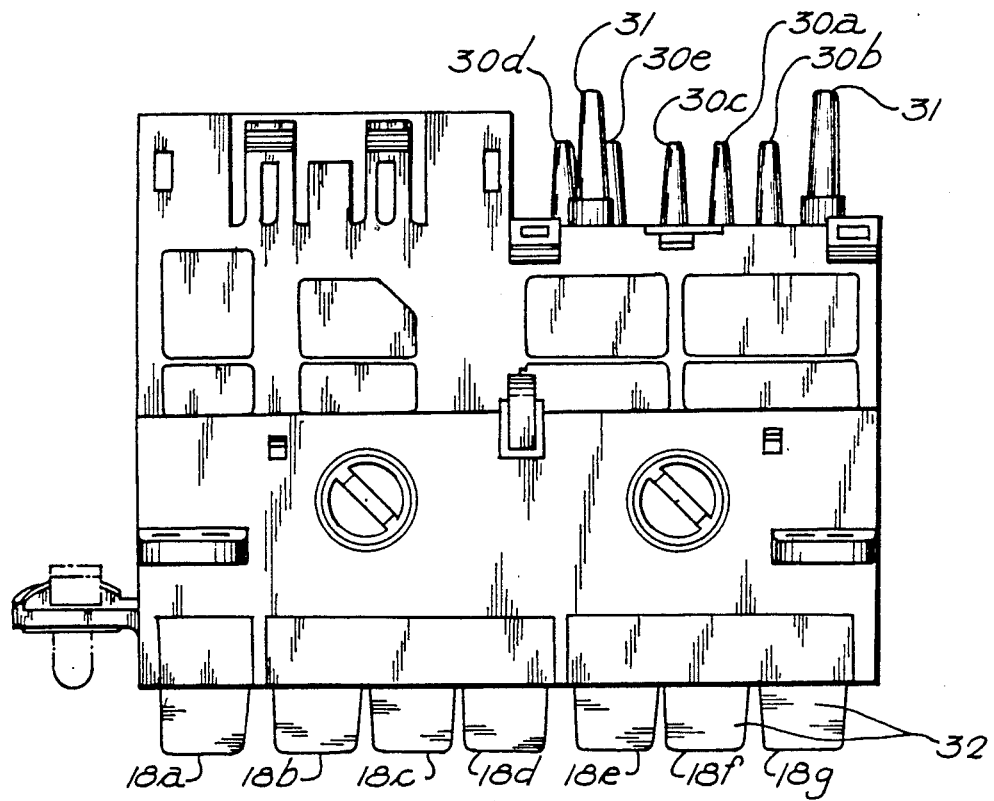
FIG. 3 is a top plan view of the control device.

The control device 10 is constructed so that the push buttons 18 can individually and directly accomplish electrical switching functions or vacuum switching (valving) functions, or both. To provide for electrical connections to the control device 10, it is provided with an electrical terminal assembly 24 including a plurality of electrical terminals such as the six illustrated prongs 26, adapted to receive an electrical connector for establishing electrical connections to the electrical system, which may include a battery, an electrical blower motor, and an electrically operable air conditioning clutch, not shown. The electrical terminal assembly 24 projects rearwardly from the housing 12 of the control device, as shown in FIGS. 3 and 4.

The control device 10 is also provided with a vacuum terminal assembly 28, also projecting from the rear of the housing 12, comprising a plurality of vacuum terminals, illustrated as five nipple-shaped ports 30, adapted to receive a vacuum connector, not shown, whereby vacuum is supplied to the control device 10 and is distributed from the control device to the various vacuum motors or operators, for moving the various air diverters and doors in the heating, ventilating and air conditioning system. The vacuum terminal assembly 28 also includes two large nipple-shaped locating posts 31.

Figure 4:
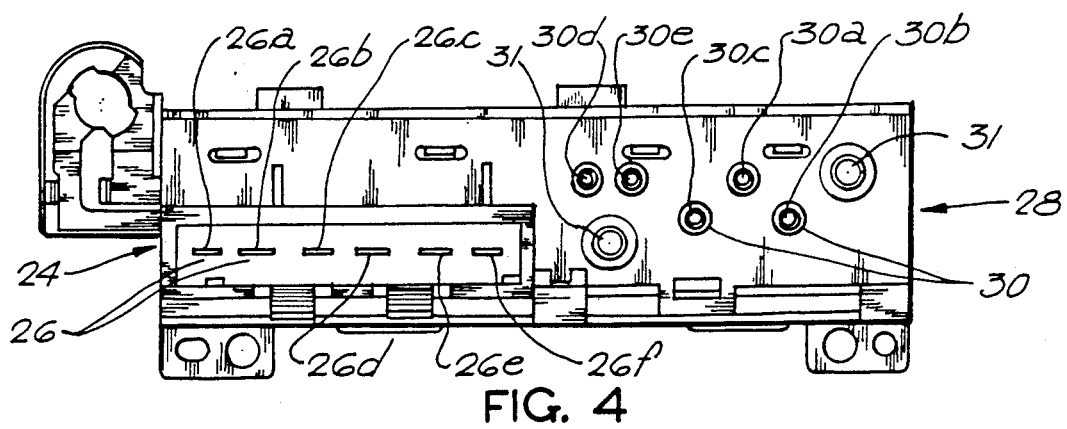
FIG. 4 is a rear elevation of the control device, showing the layout of the electrical and vacuum terminal members.

As shown in FIG. 4, which illustrates the control device 10 in an inverted position, the six individual electrical terminals are designated 26a-26f for the purposes of specific identification and detailed description. The electrical connector is adapted to establish the following connections to the electrical terminals: 26a, blower motor; 26b, blower B+ (battery plus terminal); 26c, air conditioning clutch B+; 26d, air conditioning clutch; 26e, lamp B+; and 26f, lamp ground. The lamp terminals 26e and 26f provide energization for the electrical lamps associated with the control device 10. Such lamps provide the internal illumination for the translucent window panels 20 and the indicator jewels 22 of the push buttons 18.

As shown in FIG. 4, the five nipple-shaped vacuum terminals or ports are individually designated 30a-30e for the purposes of individual identification and detailed description. The vacuum devices and components to which the ports are connected may be identified as follows: 30a, vacuum source; 30b, partial floor; 30c, full floor; 30d, panel and defog; and 30e, recirculate. The vacuum is derived from the intake manifold of the vehicle engine. The distribution ports 30b-30e selectively supply the vacuum to the various vacuum motors which operate the air diverters and doors to distribute the air from the blower to the floor air outlets, the panel air outlets, and the windshield air outlets used for the defog and defrost functions. The recirculate operator switches between conditions in which outside air is drawn into the cab, or, alternatively, the air in the cab is merely recirculated.

It will be understood that the details of the electrical terminal arrangement and the vacuum terminal arrangement may be changed to produce a variety of control devices which will accomplish many different groups of electrical and vacuum control functions.

In the illustrated control device 10, there are two electrical switching functions to be assigned to the various push buttons 18. A different number of switching functions could readily be accomplished by rearranging the construction of the control device. In the illustrated control device 1?, the two electrical switching functions are controlling the energization of the blower motor and the air conditioning clutch. In this case, the blower switching function is assigned solely to the OFF push button 18a, the depression of which opens the electrical circuit to the blower motor, so that the blower is de-energized or turned OFF. Conversely, the energizing circuit to the blower motor is closed when the push button 18a is extended.

As will appear in greater detail presently, the control device 10 has a push button latching mechanism and a lockout mechanism, whereby the depression of any individual push button causes latching of that push button and unlatching of all of the other push buttons, and whereby only one push button can be depressed at any one time, in that the depression of any one push button locks out the other push buttons. Moreover, each of the push buttons is individually spring returned to its extended position, when the push button is unlatched.

Thus, when the OFF push button 18a is depressed and latched, the blower motor is turned off and de-energized. When any of the other push buttons 18b-18g is depressed, the OFF push button 18a is spring returned to its extended position, whereby the blower motor is energized.

In the control device 10, the second electrical switching function, comprising the closure of the energizing circuit for the air conditioning clutch, is assigned individually to the push buttons 18b, 18c, 18f and 18g, marked MAX A/C, A/C, DEF FLR, and the defrost symbol, but is not assigned to the push buttons 18a, 18d and 18e, marked OFF, VENT, and FLR. The VENT and FLR push buttons 18d and 18e do not perform any electrical switching function. When all of the push buttons 18 are extended, the energizing circuit to the air conditioning clutch is open. When any one of the push buttons 18b, 18c, 18f and 18g is depressed, the energizing circuit to the air conditioning clutch is closed, so that the clutch is energized, whereby the air conditioning function is activated.

In the control device 10, vacuum switching or valving functions are assigned to all of the push buttons 18, with the exception of the seventh push button 18g, marked with the defrost symbol, which does not have any vacuum switching function. In both positions of all of the push buttons 18, the source vacuum is present at the source port 30a. When vacuum is switched to any of the distribution ports 30b-30e, the associated vacuum motor is actuated. When vacuum is not switched to any particular distribution port, such port is connected to the atmosphere, so that the associated vacuum motor is not actuated.

When the OFF push button 18a is depressed, vacuum is switched to the vacuum distribution ports 30b, 30c and 30e, identified as "partial floor", "full floor" and "recirculate". Depression of the MAX A/C push button 18b has the effect of switching vacuum to the distribution ports 30d and 30e, identified as "panel-defog" and "recirculate".

When the A/C push button 18c is depressed, vacuum is supplied to the vacuum distribution port 30d, identified as "panel-defog". This is also true when the VENT push button 18d is depressed. However, it will be recalled that the air conditioning clutch is not energized when the push button 18d is depressed.

Depression of the FLR push button 18e switches vacuum to the vacuum distribution ports 30b and 30c, identified as "partial floor" and "full floor". Depression of the DEF FLR push button 18f switches vacuum to the vacuum distribution port 30b, identified as "partial floor".

When the DEFROST push button 18g is depressed, vacuum is not switched to any of the distribution ports 30b-30e. As a result, substantially all of the air from the blower is directed to the windshield air outlets.

It is possible to unlatch all of the push buttons 18a-18g by lightly pushing any unlatched push button, in which case all of the push buttons are extended. This is not a standard operating mode. However, the blower motor is energized, because of the extended position of the OFF push button 18a. Vacuum is not switched to any of the vacuum distribution ports 30b-30e, with the result that substantially all of the air from the blower is directed to the windshield air outlets. The air conditioning clutch is de-energized, so that the air conditioning is not operating.

Each of the push buttons 18 could be molded in one piece from a suitable resinous plastic material. However, for convenience of manufacture and assembly, it is preferred to make each of the push buttons in a plurality of pieces which are easily assembled. Thus, each of the illustrated push buttons 18 comprises a hollow push button cap 32, shown in FIGS. 1-3, which is easily assembled on the front end of a push button shaft 34. The caps 32 are slidably guided by the guide means 17 in the openings 16 formed in the bezel 14. All of the push button caps are preferably the same in construction. The translucent windows 20, with their different markings for the various push buttons, are assembled into the push button caps 32. The transparent plastic jewels 22, which are the front ends of light bars, are also assembled into the push button caps 32.

With one exception, all of the push button shafts 34 are preferably the same in construction, the exception being the OFF push button 18a, which has a slightly modified, special push button shaft 34a, as will be described in detail presently.

One of the push button shafts 34 is illustrated in detail in FIGS. 43-51. The special OFF push button shaft 34a is illustrated in FIGS. 52-59. FIGS. 75-78 show assemblies involving the push button shafts 34 and other cooperating components of the control device 10. FIGS. 80-83 show assemblies involving the special OFF push button shaft 34a.

Figure 77:
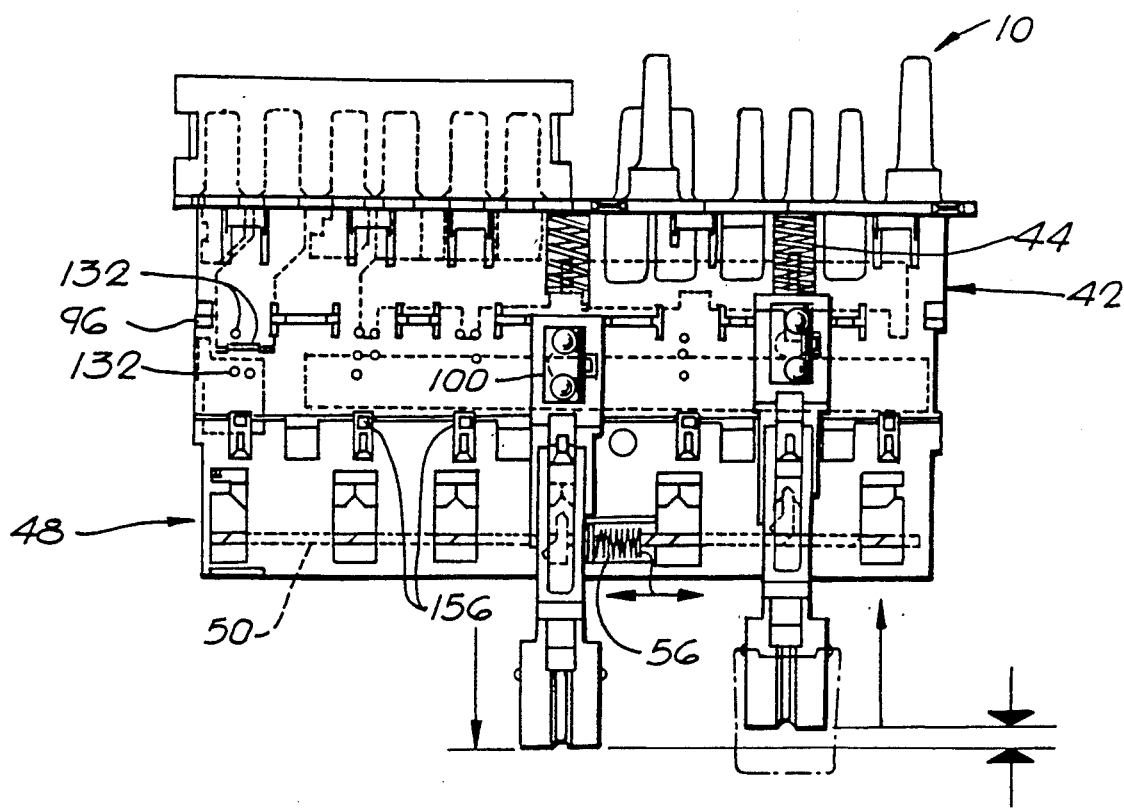
FIG. 77 is a diagrammatic top plan view, constituting a partial assembly comprising the body member, two of the push button shafts, the electrical contactors and return springs associated with the push button shafts, the latching bar with its biasing spring, and the lockout blocks, one of the push button shafts being depressed and latched.

As shown in FIGS. 43, 44 and 77, each of the push button shafts 34 has a front portion or head 36 upon which the corresponding cap 32 is slidably assembled and is securely retained by detents 38. Each push button shaft 34 has a rear portion 40 which will also be referred to as a carriage or carriage member, because it carries an electrical contactor and a valve switching member, to be described presently.

The OFF push button shaft 34a is the same in construction as the other push button shafts 34, except that the OFF push button shaft 34a has a somewhat modified carriage member 40a (FIGS. 52-59), as will be described in detail presently.

Figure 78:
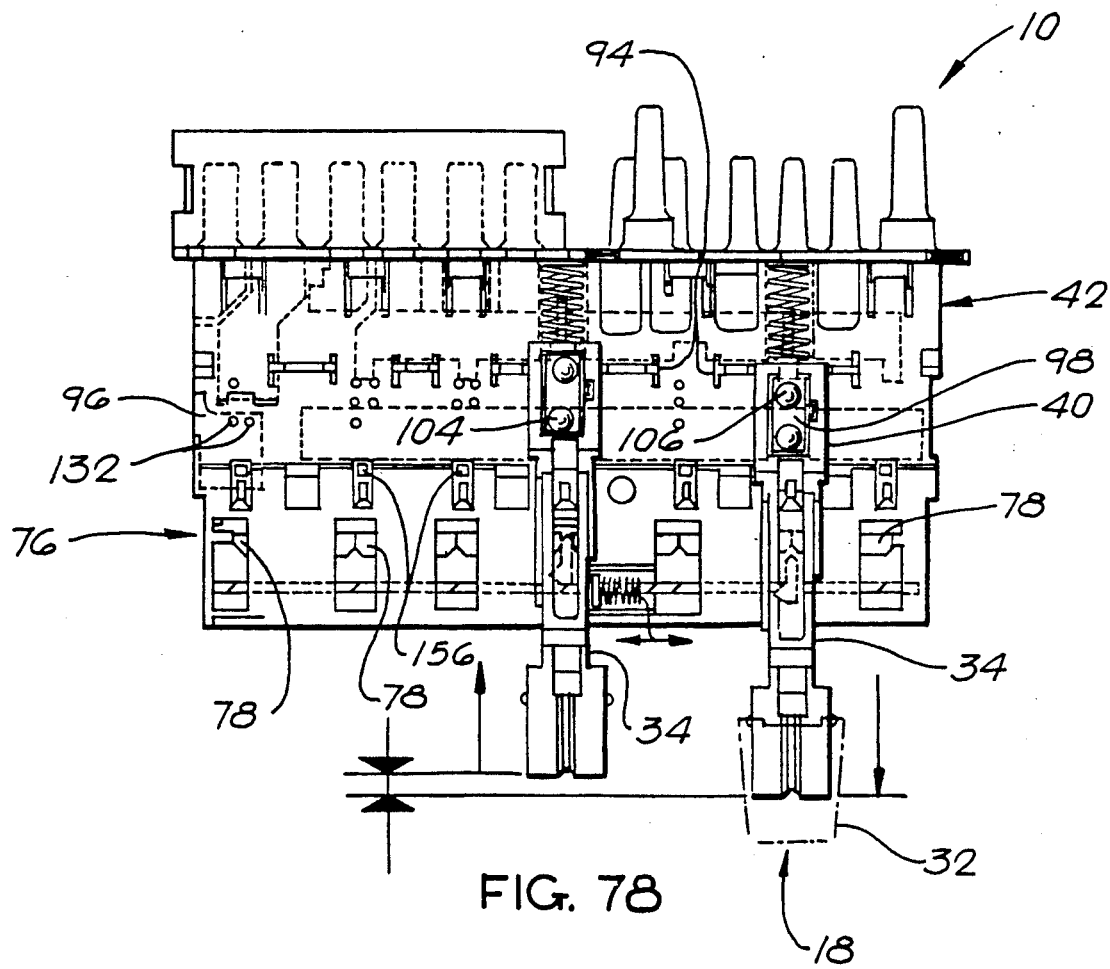
FIG. 78 is an assembly view similar to FIG. 77, but showing the other push button depressed and latched.
Figure 85:
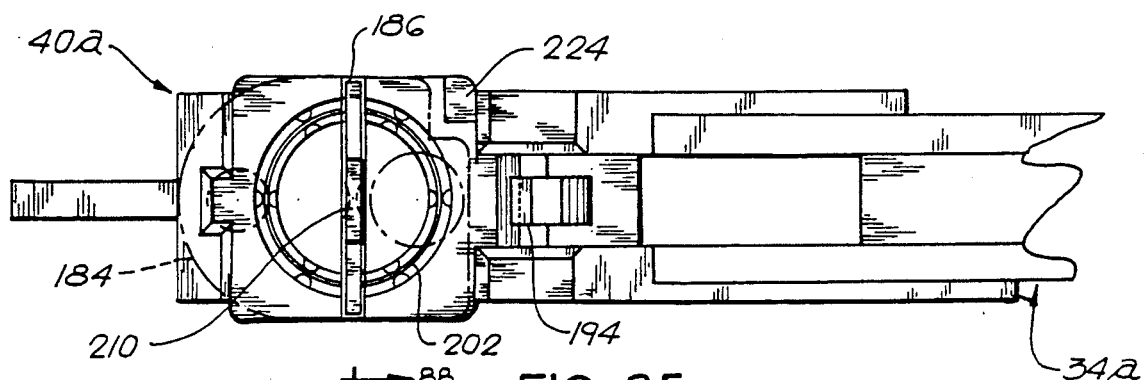
FIG. 85 is an enlarged fragmentary plan view, showing the carriage portion of the OFF push button shaft, assembled with the carriage insert block, the contactor biasing coil spring, and the contactor fulcrum member, the OFF contactor being shown in phantom.
Figure 87:
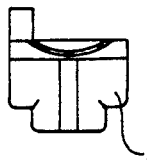
FIG. 87 is a rear elevation of the insert block.
Figure 86:
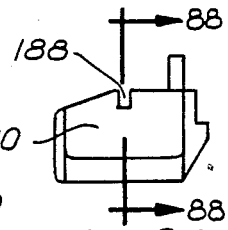
FIG. 86 is a side elevation of the OFF carriage insert block, shown in the plan view of FIG. 85.
Figure 88:
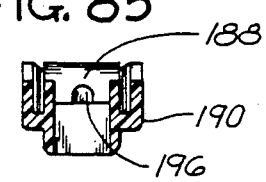
FIG. 88 is a vertical section, taken generally along the line 88—88 FIG. 86.
Figure 89:
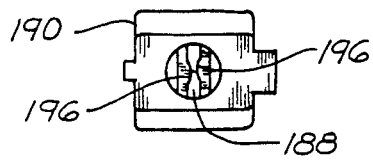
FIG. 89 is a bottom plan view of the insert block.
Figure 91:
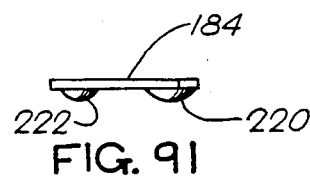
FIG. 91 is a side elevation of the OFF contactor.
Figure 92:
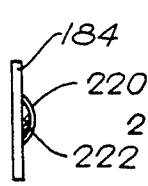
FIGS. 92 and 93 are end elevations of the opposite ends of the OFF contactor.
Figure 90:
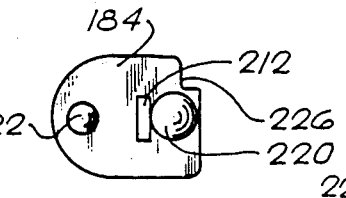
FIG. 90 is a plan view of the OFF contactor.
Figure 93:
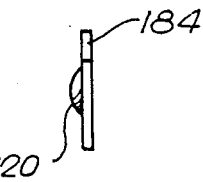
Figure 94:
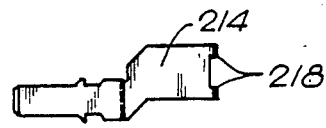
FIG. 94 is a bottom plan view of one of the fixed contacts for the OFF push button switch, such fixed contact having lugs or tabs along which the upper side of the OFF contactor is slidable.
Figure 95:
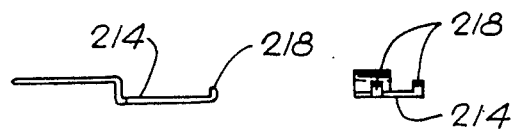
FIG. 95 is a side elevation of the fixed contact shown in FIG. 94.
Figure 96:
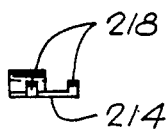
FIG. 96 is an end elevation of the fixed contact shown in FIG. 94.
Figure 97:
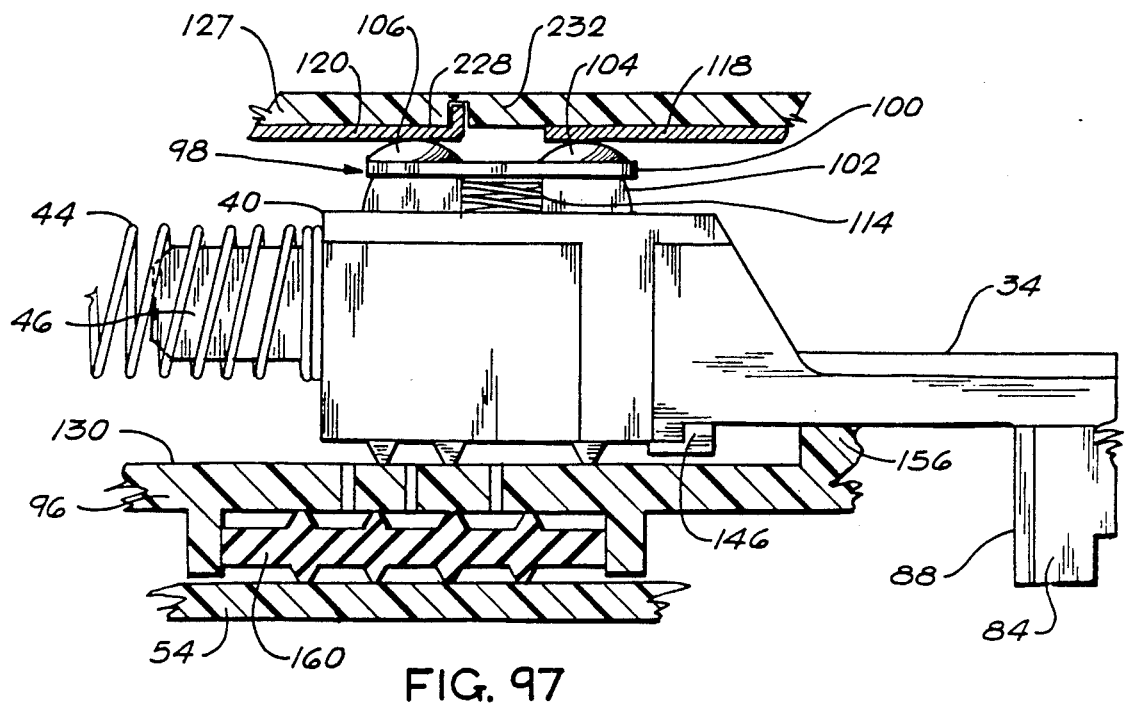
FIG. 97 is a greatly enlarged diagrammatic elevational section, taken generally along the line 97—97 in FIG. 100, and showing an assembly of one of the push button carriage members, for a push button other than the OFF push button, and the associated components, including electrical switching components and vacuum valve components.

The carriage members 40 and 40a are slidably mounted on a body member 42 of the housing 12, as shown in FIGS. 77 and 78, so that the push button shafts 34 and 34a are slidable to a limited extent from front to rear between extended and depressed positions, both of which are shown in FIGS. 77 and 78. The push button shafts 34 and 34a are spring biased toward their extended positions by spring means, illustrated as seven individual compression coil springs 44, each of which is located on a prong or lug 46, projecting rearwardly from the corresponding carriage member 40 or 40a.

The control device 10 is provided with a latching mechanism 48 (FIGS. 75-78), including a transversely slidable latching bar 50, for latching each of the individual push buttons 18 in its depressed position. The latching bar 50 is slidable transversely in a channel 52 (FIGS. 12 and 79) formed in the underside of the body member 42. The latching bar 50 is slidably contained in the channel 52 by a lower cover member 54 (FIGS. 5-10) of the housing 12. The latching bar 50 is biased in one direction of its sliding movement by spring means, illustrated in FIGS. 75 and 76 as a compression coil spring 56, nested into a recess 58 in the body member 42, and compressed between the body member 42 and an upwardly projecting element 60 on the latching bar 50.

Figure 104:
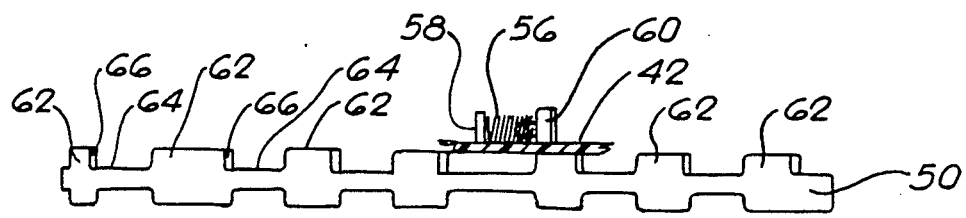
FIG. 104 is a diagrammatic vertical section, taken generally along the 104—104 in FIG. 103, and showing the assembly of the latching bar with its biasing spring.

The latching bar 50 has seven upwardly projecting latch tabs 62, as shown diagrammatically in FIG. 104, for individually latching the seven push buttons 18. Spaces 64 are provided between the latch tabs 62. Each latch tab 62 has a diagonal actuating ramp 66, whereby the latching bar 50 is displaced by the depression of each push button 18.

Each of the push button shafts 34 and 34a has a downwardly projecting latching tooth 68 which latches behind the corresponding latch tab 62, when that particular push button is depressed. Each latching tooth 68 has oppositely sloping ramps 70 and 72, for successively engaging the corresponding latch tab 62, when the push button is depressed, and a latching shoulder 74, adapted to latch behind the corresponding latch tab 62.

FIG. 75 includes a diagrammatic representation of the latching teeth 68 for two representative push buttons 18, one of which, shown at the left, is in its extended position, while the other, shown at the right, is in its depressed and latched position. Referring to the right-hand latching tooth 68, the latching shoulder 74 thereon is latched behind the corresponding latch tab 62 of the latching bar 50. Referring to the latching tooth 68 at the left, the ramp 66 on the corresponding latch tab 62 is in engagement with the ramp 70 of the latching tooth. If the push button 18 at the left is depressed, the ramp 70 on the latching tooth 68 will displace the ramp 66 on the corresponding latch tab 62, so that the latching bar 50 will be translated to the left, against the biasing force of the spring 56, which will be compressed. The ramps 70 and 66 are sufficiently long so that the right-hand latching tooth 68 is unlatched, in that the latch tab 62 is moved far enough to the left so that it escapes from the latching shoulder 74 on the tooth 68. The ramps 72 and 70 slide past the latch tab 62 as the unlatched push button 18 is translated to its extended position by its return spring 44.

Continued depression of the left-hand push button 18 in FIG. 75 causes the ramps 70 and 72 on its latching tooth 68 to move rearwardly, past the corresponding latch tab 62 until the latch tab 62 is able to move to the right behind the corresponding latching shoulder 74. The latch bar return spring 56 causes the latching bar 50 to return to the right until the ramp 70 on the right-hand latching tooth 68 is engaged by the ramp 66 on the corresponding latch tab 62. Thus, when any of the push buttons 18 is fully depressed, any previously latched push button is unlatched, while the depressed push button is latched by the corresponding latch tab 62 on the latching bar 50. The unlatched push button 18 is returned to its extended position by its return spring 44.

The control device 10 also comprises a lockout mechanism 76, shown particularly in FIGS. 75 and 78, for preventing the depression of more than one of the push buttons 18 at any one time. The lockout mechanism 76 comprises six lockout blocks 78 which are arranged in a row and are slidably received in a transverse channel 80, formed in the underside of the body member 42, and located rearwardly of the channel 52 for the latching bar 50. The aggregate length of the lockout blocks 78 is somewhat less than the length of the channel 80, so that a clearance space 82 can exist between any adjacent pair of the lockout blocks, or between either of the endmost lockout blocks and the corresponding end of the channel 80. As shown diagrammatically in FIG. 75, each of the push buttons 18 has a lockout penetrating member 84, adapted to penetrate and occupy the clearance space 82 with an easy sliding fit. Each lockout penetrating member has a thickness which is only slightly less than the available clearance space 82, so that there is no possibility that any of the other lockout penetrating members 84 of the other push buttons 18 can penetrate any of the other spaces along the row of lockout blocks 78. Thus, only one of the push buttons 18 can be depressed at any one time.

At their opposite ends, the slidable lockout blocks 78 have oppositely sloping diagonal ramps or cam surfaces 86 to facilitate the entry of any one of the lockout penetrating members 84 into the corresponding space, if it is available. Each of the illustrated lockout penetrating members 84 has a V-shaped penetrating point or edge 88, adapted to have an easy camming action on the ramps 86 at the end of the lockout blocks 78. The point 88 may be otherwise shaped, such as rounded. In this case, each of the lockout penetrating members 84 projects rearwardly from the corresponding latching tooth 68 on the corresponding push button shaft 34 or 34a. Each latching tooth 68, with the corresponding lockout penetrating member 84, projects downwardly from the corresponding push button shaft 34 or 34a and is molded in one piece therewith of a suitable resinous plastic material.

Figure 101:
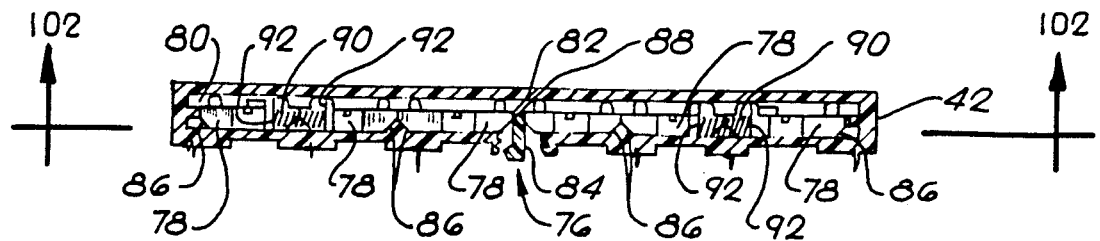
FIG. 101 is a horizontal section, taken generally along the line 101—101 in FIG. 102, and showing an assembly of the lockout blocks and the associated biasing springs.
Figure 102:
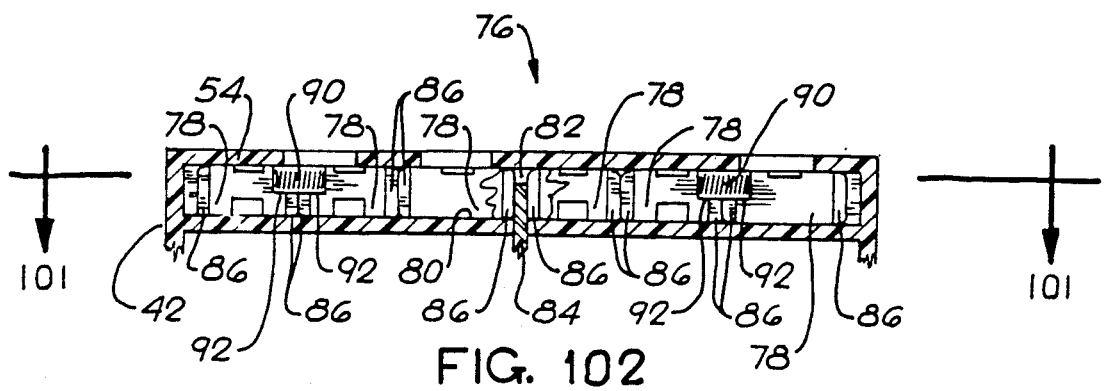
FIG. 102 is a vertical section, taken generally along the line 102—102 in FIG. 101, and showing the assembly of the lockout blocks and their associated biasing springs.
Figure 103:
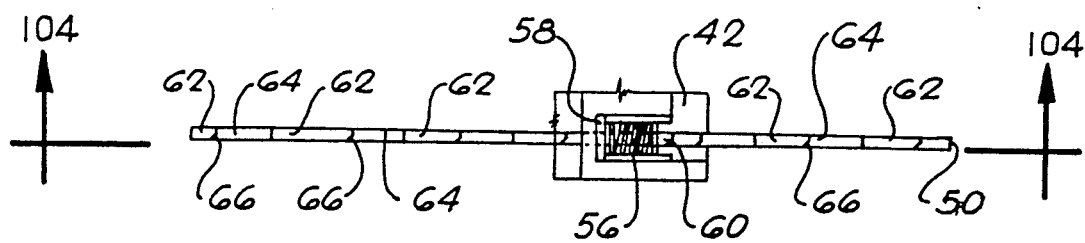
FIG. 103 is a diagrammatic plan view of the latching bar, showing an assembly with its biasing spring.

In accordance with a feature of the present invention, the lockout mechanism 76 includes spring means for resiliently taking up any looseness or play between the lockout blocks 78, to prevent any rattling of the lockout blocks 78. Any rattle of any kind is highly undesirable in a device intended for use on an automotive vehicle, because the occupants of the vehicle may be bothered by even small rattles. Freedom from rattles is often considered to be an indication of high quality in an automotive vehicle. To provide such spring means, at least one spring is needed to act upon the row of lockout blocks 78. Even one spring along the row of lockout blocks 78 will reduce rattles and will eliminate rattles under certain circumstances. However, it is preferred to provide two takeup springs 90 along the row of six lockout blocks 78, and to arrange the springs so that they act between the endmost pairs of the lockout blocks 78, as shown in FIGS. 79, 101 and 102. The illustrated springs 90 are compression coil springs and are compressed between the lockout blocks 78 of the endmost pairs thereof. To receive the springs 90, the four endmost lockout blocks 78 are formed with recesses or nests 92, so that the compression springs 90 can be recessed into the transverse channel 80 in which the lockout blocks are slidable.

When all of the push buttons 18 are extended, the springs 90 take up the clearance space 82, so that rattling of the lockout blocks 78 is prevented, despite the existence of the clearance space. When any particular push button 18 is depressed and latched, its lockout penetrating member 84 occupies most of the clearance space 82, and the two springs 90 take up any remaining clearance, so that no rattling of the blocks 78 can occur, no matter which push button is depressed. In view of the fact that only one of the push buttons 18 can be depressed at any one time, there will always be spring loading of all of the lockout blocks 78, even though the blocks may be divided into two groups on opposite sides of the corresponding lockout penetrating member 84, in some cases. The strength of the springs 90 is sufficient to prevent rattling of the lockout blocks, but the spring loading afforded by the springs is not great, so that each of the lockout penetrating members 84 easily displaces the lockout blocks against the biasing forces afforded by the springs.

FIGS. 77 and 78 illustrate two representative push button shafts 34 which are typical of all of the push button shafts 34. The OFF push button shaft 34a is somewhat modified in construction, as will be described presently. The carriage member 40 of each shaft 34 is slidable from front to rear on the body member 42 between guide flanges 94, a series of which project upwardly from a port plate 96 which is a member on the body 42. Each of the push button shafts 34 is movable between depressed and extended positions, as represented by the two shafts 34 in FIGS. 77 and 78.

Each of the carriage members 40 is provided with an electrical contactor 98, made of copper or some other electrically conductive material, for carrying out a switching function, which in this case is the energization and de-energization of the electrical circuit for the air conditioning clutch. As illustrated separately in FIGS. 60–62, each contactor 98 is generally angle-shaped and is shown as comprising first and second flanges 100 and 102, with a generally rectangular relation therebetween. The first flange 100 is provided with contact means in the form of first and second spherically rounded contact points 104 and 106, for engaging fixed contact members, as will be described presently. The second flange 102 is shown as having detent means in the form of a spherically rounded detent point or bump 108, for detaining the contactor 98 on the carriage member 40.

As shown in the diagrammatic, greatly enlarged assembly views of FIGS. 97–100, the second flange 102 of the electrical contactor 98 is adapted to be slidably received and guided in guide means formed in the carriage member 40, such guide means taking the form of a vertical guide slot 110 extending downwardly into the upper side 112 of the carriage member 40. The first flange 100 of the contactor 98 is biased upwardly, relative to the carriage member 40, by spring means, shown in the form of a compression coil spring 114, received in a generally cylindrical spring nest or recess 116, extending downwardly into the upper side 112 of the carriage member 40, and compressed between the carriage member 40 and the first contactor flange 100, so as to bias it upwardly and provide spring pressure between the contact points 104 and 106 and first and second fixed contacts 118 and 120, shown as electrically conductive metal bars, as will be described in greater detail presently.

As shown in FIGS. 60–62, the contactor 98 is preferably bent from a flat plate to form the first and second flanges 100 and 102, with a substantially rectangular relationship therebetween. Except for the provision of the rounded contact points 104 and 106, the first flange 100 is flat. Similarly, the second flange 102 is flat, except for the provision of the rounded detent point or bump 108, projecting laterally therefrom.

AS shown in FIGS. 97–100, the second contactor flange 102 and the guide slot 110 constitute the sole guiding and supporting means for the contactor 98. The second contactor flange 102 and the guide slot 110 extend in a direction which is substantially parallel with the direction of the path along which the carriage 40 is movable. The first and second contactor flanges 100 and 102 have substantially the same length along the direction of such path. The contactor points 104 and 106 are spaced apart along the direction of such path.

Figure 99:
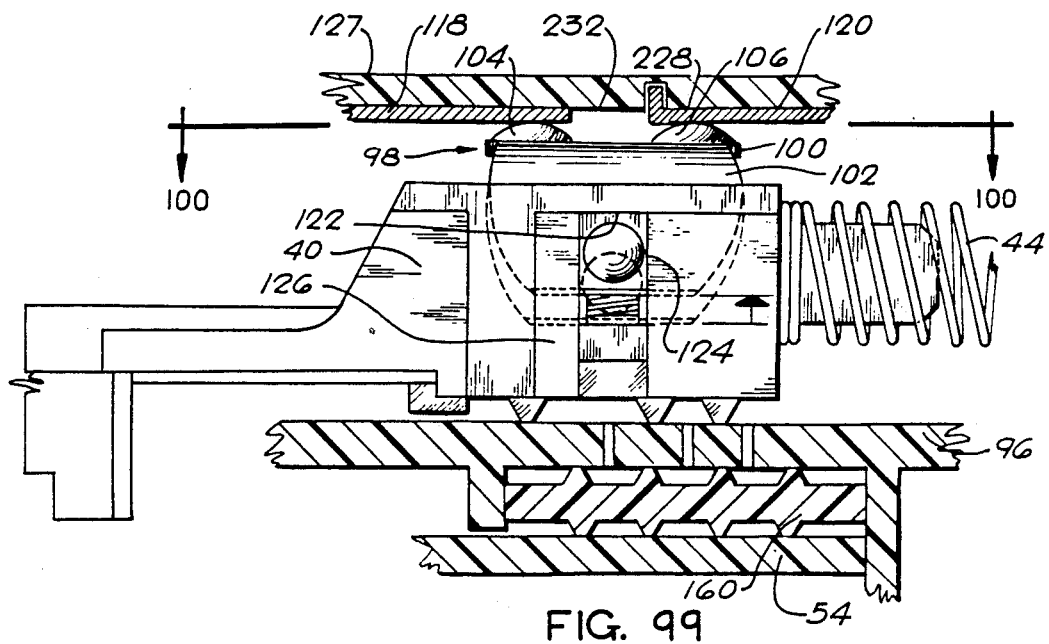
FIG. 99 is a diagrammatic greatly enlarged elevational section, taken generally along the line 99—99 in FIG. 100, through the assembly of FIGS. 97 and 98.
Figure 100:
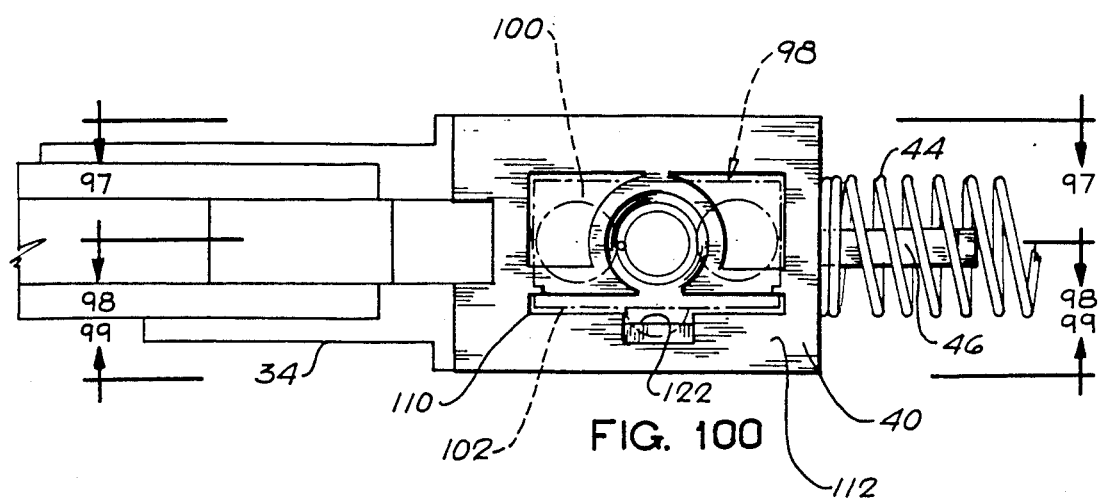
FIG. 100 is a diagrammatic greatly enlarged plan view, taken generally along the line 100—100 in FIG. 99, but with the electrical contactor shown in phantom.

The detent point or bump 108 on the second contactor flange 102 is adapted to cooperate with detent means on the carriage member, for detaining the second flange 102 in the guide slot 110, while providing for the vertical sliding movement of the second flange 102 in the slot 110, such detent means being shown in the form of a detent bar formation 122 which partially obstructs the entry of the detent point 108 into a detent guide channel or slot 124 in one side wall 126 of the carriage member 40, as shown particularly in FIGS. 99 and 100. The detent bar formation 122 and the side wall 126 are sufficiently flexible and resilient to spring outwardly to permit the detent point 108 to be forced downwardly past the bar formation 122, when the second contactor flange 102 is pushed downwardly into the guide slot 110, with a moderate amount of force. Thus, the angle-shaped contactor 98, the coil spring 114 and the carriage member 40 can readily be assembled, with the coil spring 114 compressed between the first contactor flange 100 and the spring nest 116 in the carriage member 40. The detent point 108 is detained in the guide channel 124 by the bar formation 122, so that the assembly is held together, despite the biasing force of the spring 114. This construction greatly facilitates the final assembly of the control unit 10.

It will be seen from FIGS. 97–100 that the detent guide channel 124 extends substantially perpendicular to the direction of the path along which the carriage 40 is movable. As shown, the path of carriage 40 is horizontal, while the direction of the guide channel 124 is vertical so that the detent point 108 is guided for vertical movement.

The fixed electrical contacts 118 and 120 are securely mounted on an electrically insulating member illustrated as the upper cover member 127 of the housing 12 for the control device 10. The contactor 98 is movable horizontally with the push button carriage 40 and is movable vertically, relative to the carriage 40, toward and away from the fixed contacts 118 and 120. The contactor spring 114 exerts a spring biasing force which presses the contactor points 104 and 106 toward the fixed contacts 118 and 120. At the same time, the biasing spring 114 exerts a downward spring force on the push button carriage 40, such force being employed as a valve sealing force, as will now be described.

Thus, the push button carriage 40 also carries valve means, shown as a soft resilient valve member or plate 128, which may be made of silicone rubber and is slidable along a smooth upper surface 130 of the port plate 96. A number of valve ports 132 extend through the port plates 96 and are arranged in various patterns to cooperate with the various valve members 128 of the push buttons 18, to accomplish the desired valving or valve switching functions. Any known or suitable patterns of the valve ports 132 may be employed to accomplish the desired functions.

The contactor biasing spring 114 exerts a downward spring force on the carriage 40, and such force is transferred to the valve member 128, so that it is pressed into sealing engagement with the smooth upper surface 130 on the port plate 96. Thus, the spring 114 does double duty as both the contactor biasing spring and the valve sealing spring.

Figures 14, 15:
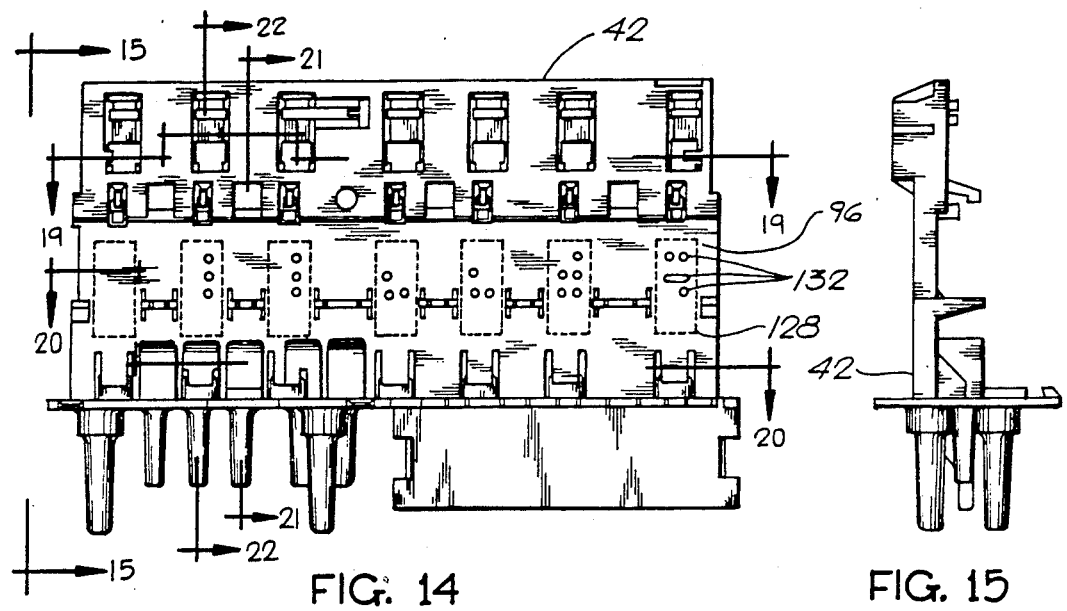
FIG. 14 is a top plan view of the body member.
FIG. 15 is a side elevation showing one side of the body member, generally as indicated by the line 15—15 in FIG. 14.
Figures 13, 16:
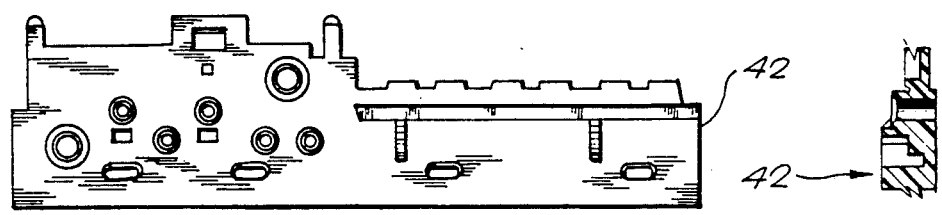
FIG. 13 is a rear elevation of the body member.
FIG. 16 is a fragmentary section, taken generally along the line 16—16 in FIG. 12.

The silicone rubber valve member 128 is mounted on the underside of the push button carriage 40 and is shown as being received and confined in a generally rectangular recess 134, molded into the underside of the carriage 40. The valve member 128 is detailed separately in FIGS. 64–70. The valve members 128 for all of the seven push buttons 18 may be the same or similar in construction, or may be modified as needed. However, the port arrangements are different, as shown in FIGS. 14 and 77, for example, so that the valving functions can be different. FIG. 64 shows the bottom or operative side of the valve member 128, which is illustrated as having a system of downwardly projecting ridges or fins 136 which are in slidable sealing engagement with the smooth upper surface 130 of the port plate 96. As illustrated, the ridges 136 form the boundaries of three closed valving channels or passages 138, 140 and 142 having different configurations, which may be described as long, short and L-shaped, respectively. Speaking generally, the short channel 140 may be employed to block one of the valve ports 132, while the long and L-shaped channels 138 and 142 may be employed to connect different ports together, in certain positions of the valve members 128.

FIG. 65 shows the upper or passive side of the valve member 128, having a pattern of upwardly projecting ridges or fins 144 forming a mirror image of the pattern established by the valving ridges 136. The upper ridges 144 provide a soft resilient spring action for the valving ridges 136, as disclosed and claimed in the Halstead and Black U.S. Pat. No. 4,448,390, patented May 15, 1984.

Figure 98:
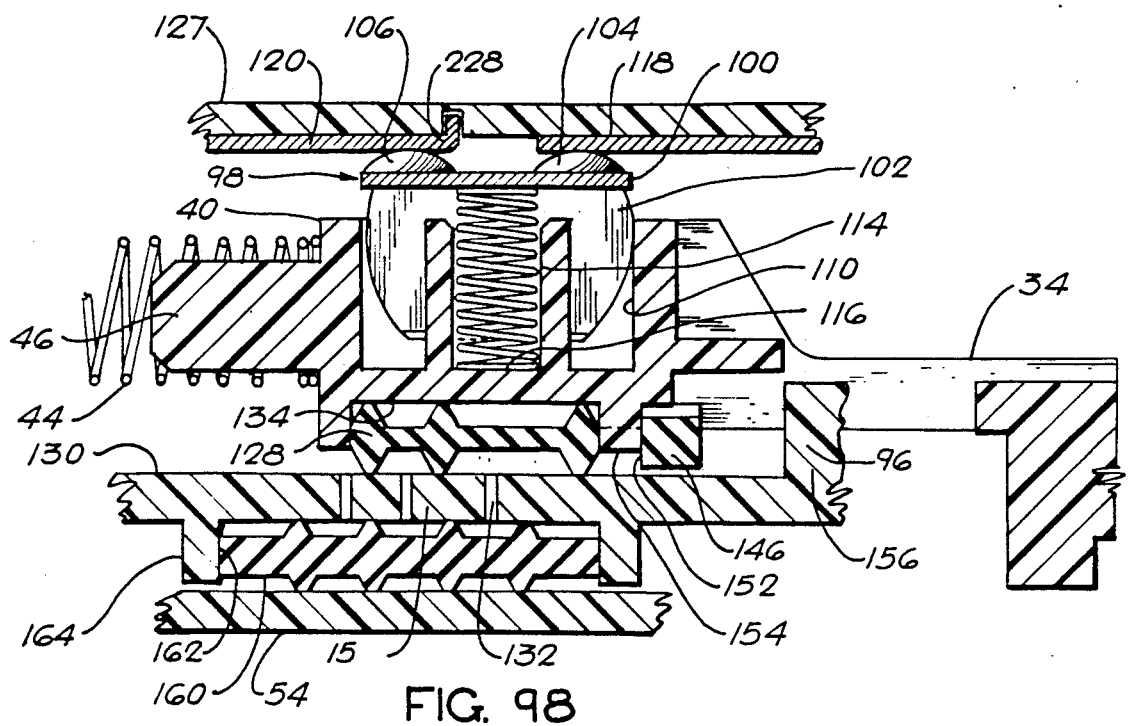
FIG. 98 is a greatly enlarged diagrammatic elevational section, taken generally along the line 98—98 in FIG. 100, through the assembly of FIG. 97.

As shown in FIGS. 64–67, the valve member 128 has a forwardly projecting extension or tab 146 connected to the main body 148 of the valve member 128 by a neck or web member 150, in which a non-symmetrical keyway opening 152 is formed. When the valve member 128 is mounted on the push button carriage member 40, as shown in FIG. 98, for example, the non-symmetrical keyway opening 152 receives a correspondingly shaped locating key or lug member 154, shown separately in FIG. 48. As shown, the keyway opening 152 and the locating key 154 are generally wedge-shaped, but may be of some other non-symmetrical shape, to insure that the valve member 128 is assembled in the proper orientation on the carriage member 40, and is not assembled upside down.

The forwardly projecting extension or tab 146 is molded in one piece with the silicone rubber valve member 128 and is adapted to function as a soft resilient stop pad, to deaden and reduce the noise which is produced when each of the push buttons 18 is unlatched so that it is returned to its extended position by its return spring 44. When each push button 18 is returned to its extended position, the soft resilient extension or tab 146 engages a corresponding stop lug 156, seven of which project upwardly from the body member 42 of the control device 10, as shown in FIG. 98, and also in FIGS. 77 and 78, for example.

When each of the push button carriages 40 is moved between its extended and depressed positions, the corresponding valve member 128 is adapted to change the valving connections between the various individual valve ports 132 in the port plate 96. Each of the valve ports 132 extends through the port plate 96, as shown in FIG. 98, for example, from the smooth upper surface 130 along which the valve member 128 is sealingly slidable, to a lower surface 158 of the port plate 96.

The control device 10 is provided with vacuum distribution means for establishing a program of fluid connections between the valve ports 132 and the terminal ports or nipples 30a–30e, previously described in connection with FIGS. 3 and 4, whereby vacuum is supplied from and delivered to a vacuum connector, leading to a vacuum source and various vacuum operated motors in the air control system, as previously described. The terminal ports 30a–30e are also shown in FIGS. 12, 14 and 79, for example.

FIGS. 71–73, 79–81 and 97–99 show the vacuum distribution means as comprising a manifold member 160 which may be platelike in form and may be made of a suitable soft resilient rubberlike material, such as silicone rubber, for sealing engagement with the lower surface 158 of the port plate 96. The manifold member 160 is confined within a recess or space 162, formed by a system of flanges 164, projecting downwardly from the port plate 96. The manifold member 160 is pressed upwardly within the recess 162 by the lower cover member 54 of the housing 12 for the control device 10, so that the manifold member 160 is held in sealing engagement with the lower surface 158 of the port plate 96.

Figures 12, 17:
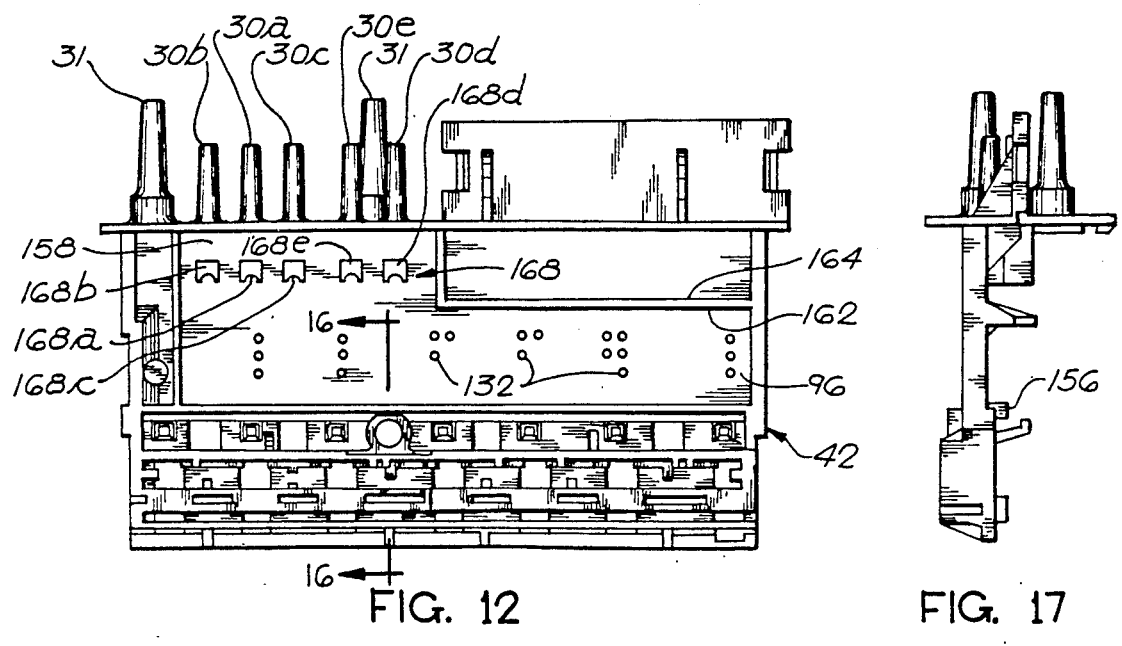
FIG. 12 is a bottom plan view of an intermediate or body member for the housing of the control device.
FIG. 17 is a side elevation, showing the opposite side of the body member, in relation to the side shown in FIG. 15.
Figure 21:
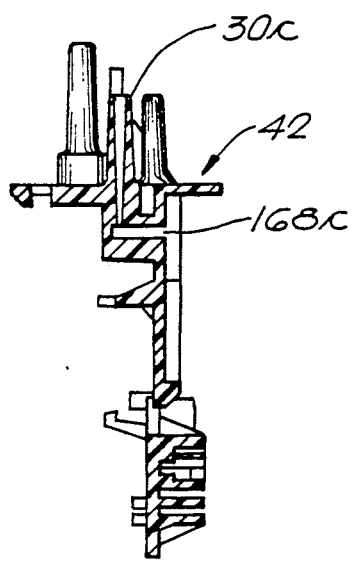
FIG. 21 is a vertical section, taken generally along the line 21—21 in FIG. 14.
Figure 22:
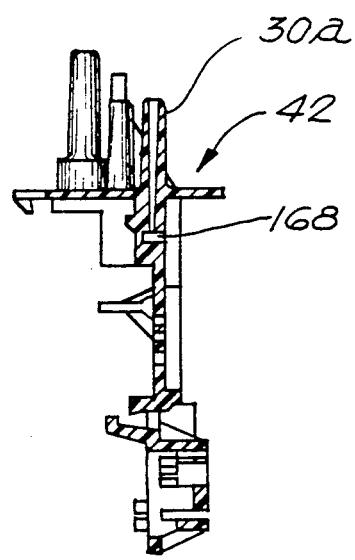
FIG. 22 is a vertical section, taken generally along the line 22—22 in FIG. 14.
Figure 20:
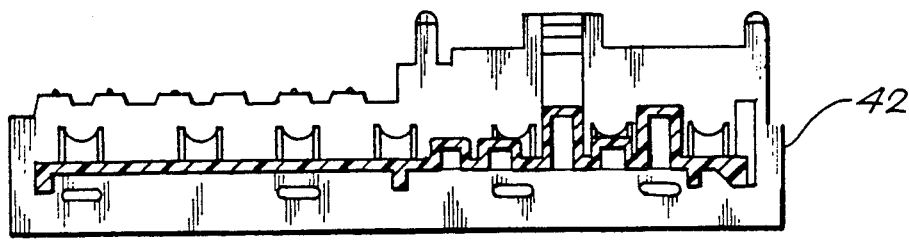
FIG. 20 is a vertical section, taken generally along the broken line 20—20 in FIG. 14.
Figure 19:
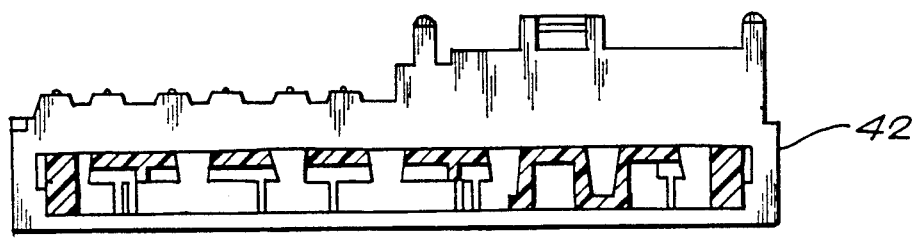
FIG. 19 is a vertical section, taken generally along the broken line 19—19 in FIG. 14.
Figure 18:
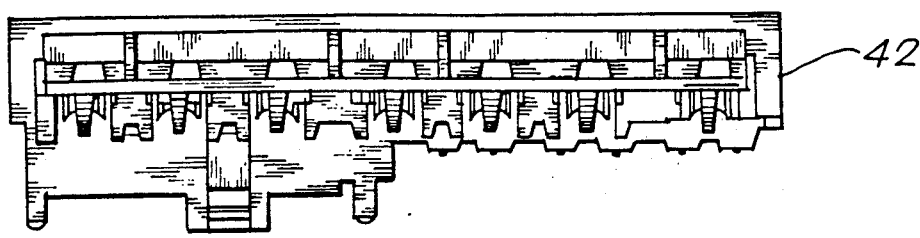
FIG. 18 is an elevation of the body member, looking from the front toward the rear, shown in an inverted position.
Figure 25:
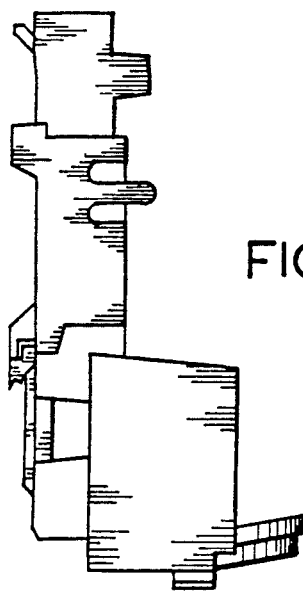
FIG. 25 is a side elevation, showing one side of the top cover.
Figure 26:
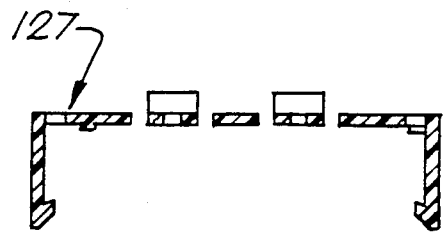
FIG. 26 is a fragmentary section, taken generally along the line 26—26 in FIG. 24.
Figure 24:
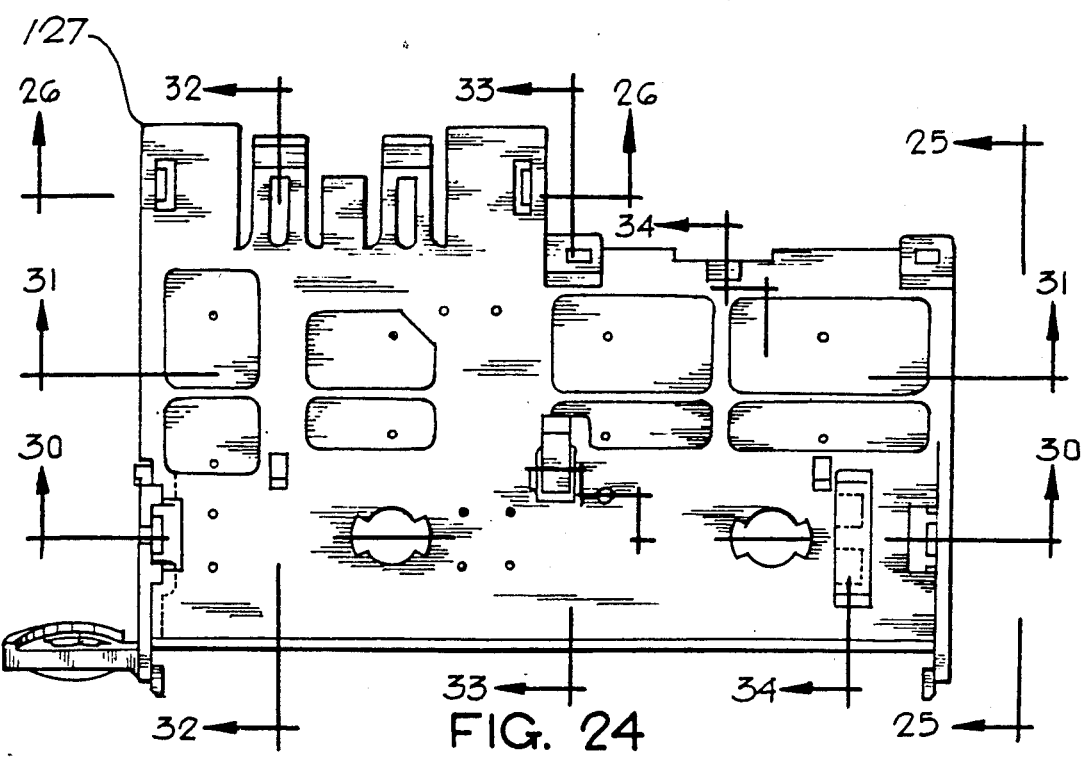
FIG. 24 is a top plan view of the top cover.
Figure 23:
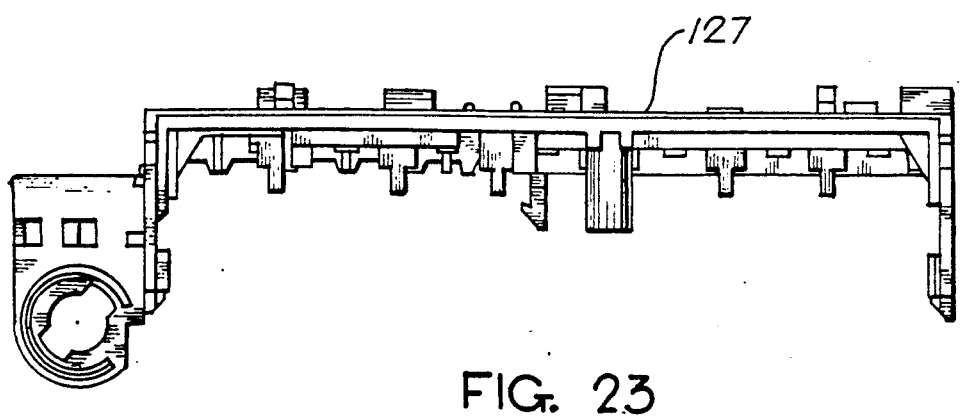
FIG. 23 is a front elevation of the top cover for the housing of the control device.
Figure 29:
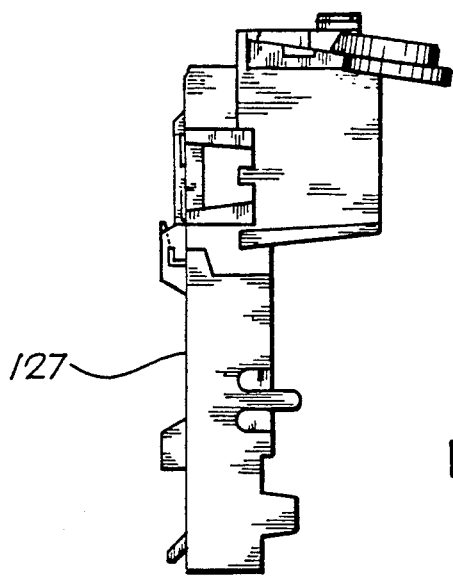
FIG. 29 is a side elevation, showing the opposite side of the top cover, in relation to the side shown in FIG. 25.
Figure 28:
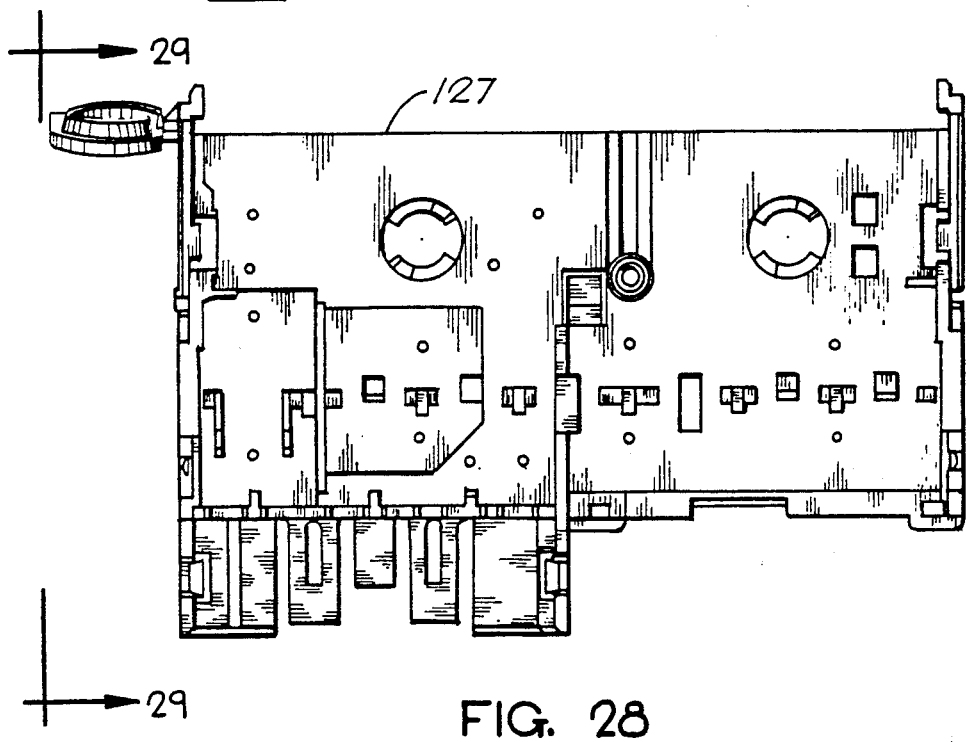
FIG. 28 is an underside plan view of the top cover.
Figure 27:
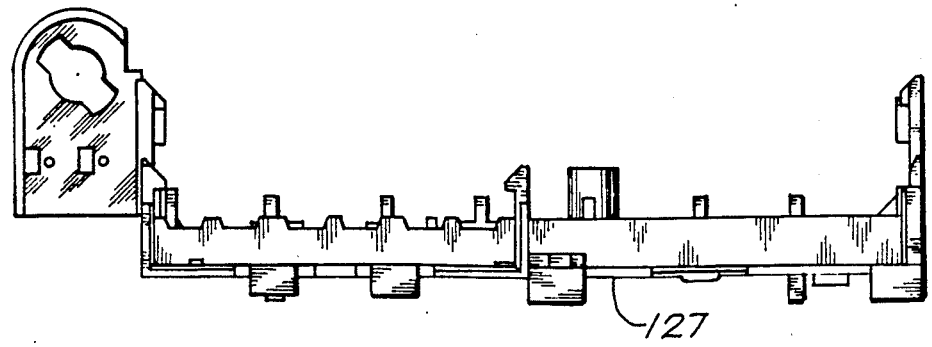
FIG. 27 is a rear elevation of the top cover, shown in an inverted position.
Figure 37:
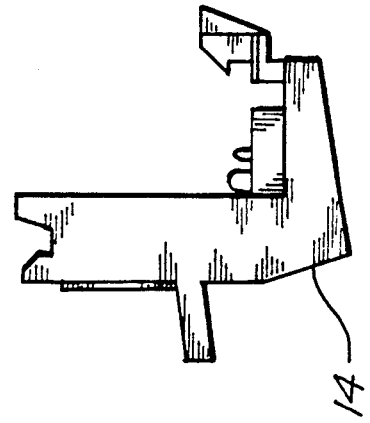
FIG. 37 is a side elevation, showing one side of the bezel member.
Figure 38:
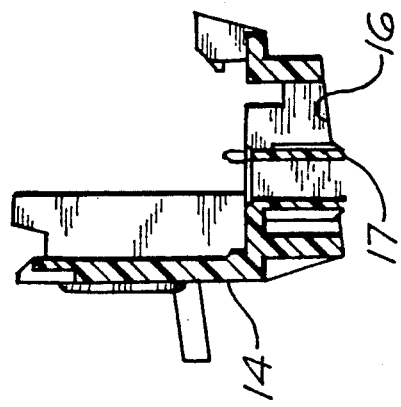
FIG. 38 is a vertical section, taken generally along the line 38—38 in FIG. 36.
Figure 36:
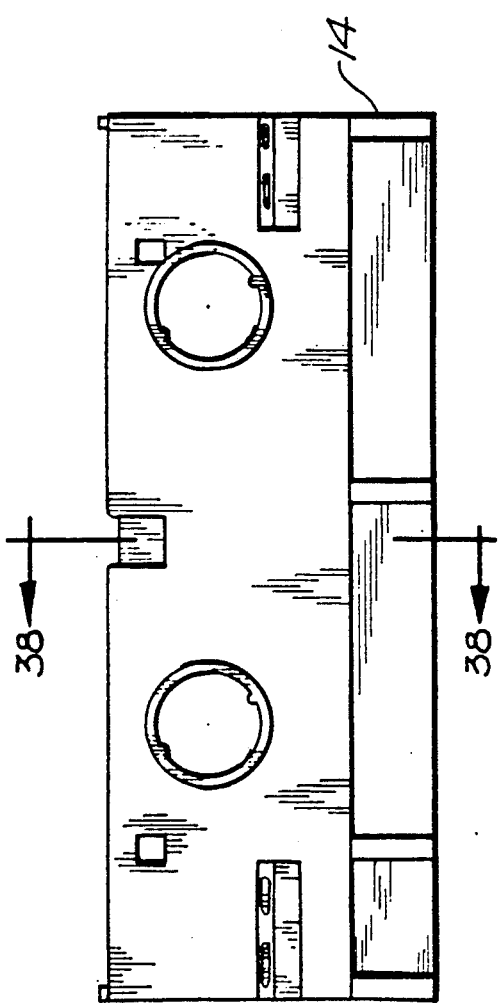
FIG. 36 is a top plan view of the bezel member.
Figure 35:
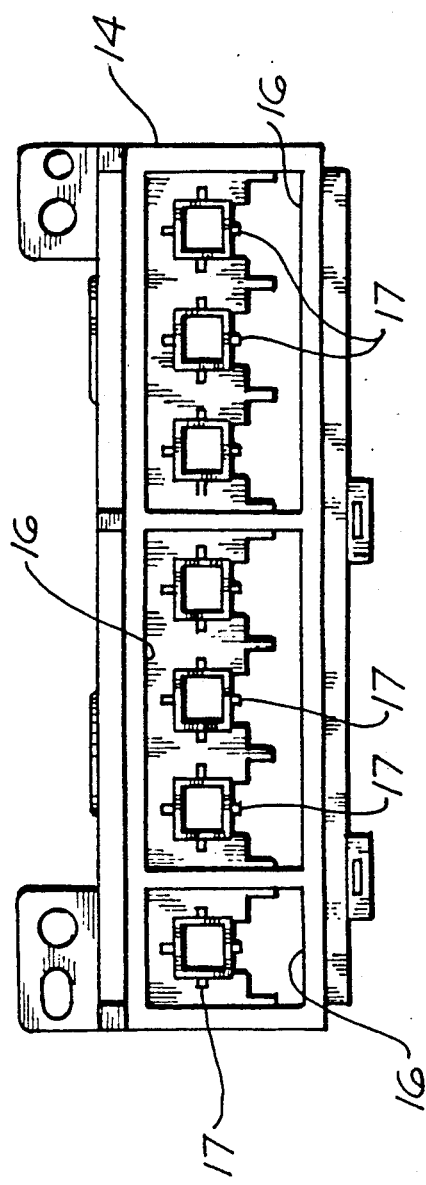
FIG. 35 is a front elevation of a bezel member for the housing of the control device.
Figure 40:
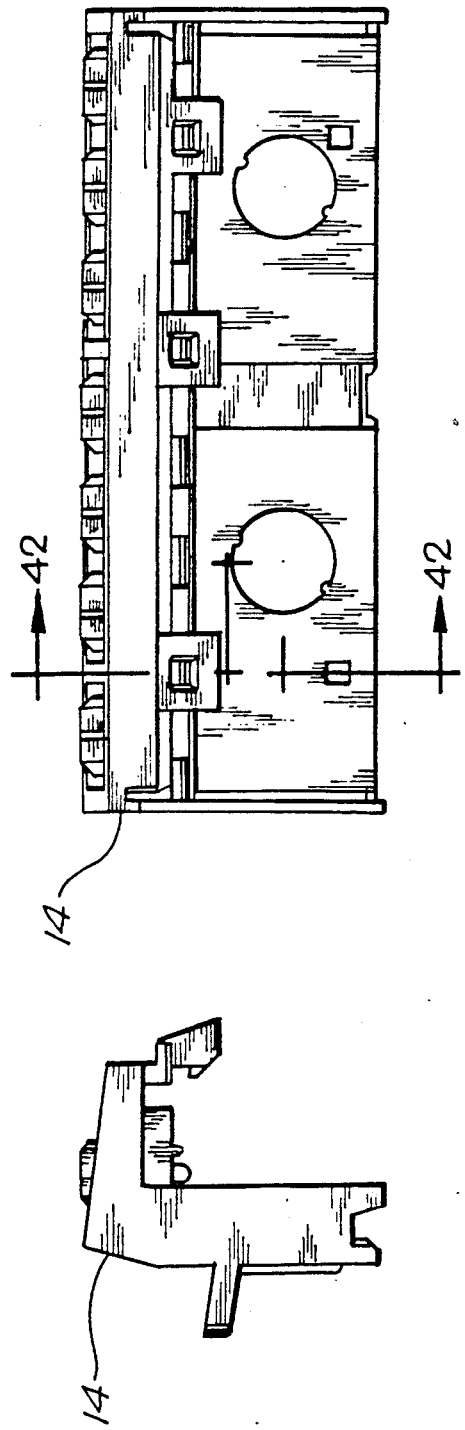
FIG. 40 is an underside plan view of the bezel member.
Figure 39:
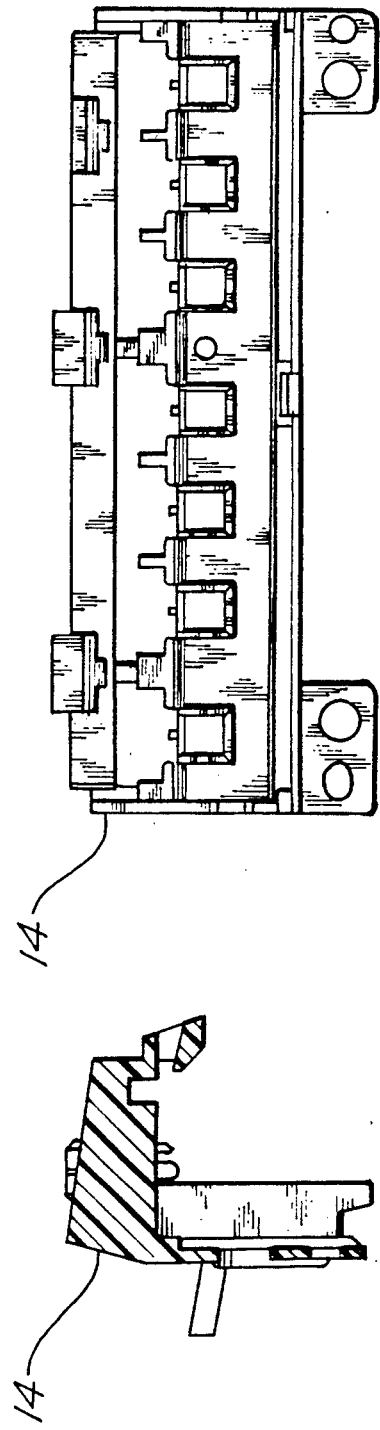
FIG. 39 is a rear elevation of the bezel member, shown in an inverted position.
Figure 41:
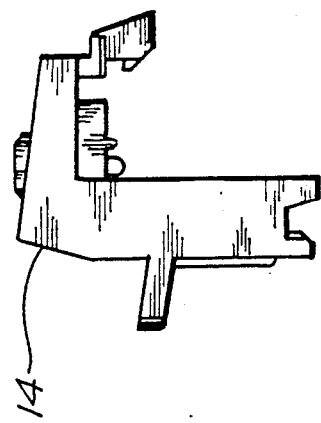
FIG. 41 is a side elevation, showing the opposite side of the bezel member, in relation to the side shown in FIG. 37.
Figure 42:
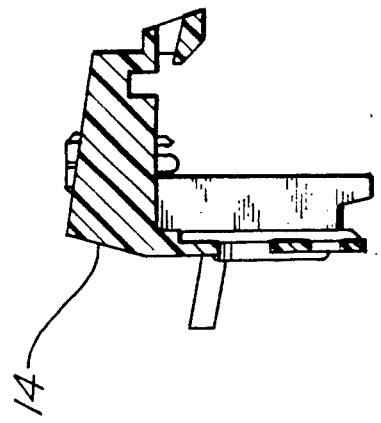
FIG. 42 is a vertical section, taken generally along the broken line 42—42 in FIG. 40.

The body member 42 of the housing 12 for the control device 10 is illustrated separately in FIGS. 12–17, of which FIG. 12 is a bottom plan view, showing the valve ports 132 extending into the lower surface 158 of the port plate 96. The valve ports 132 are within the recess or nest 162 which is adapted to receive and retain the manifold member 160, not shown in FIG. 12. The removal of the manifold member 160 reveals an array of five passages 168, individually identified as 168a, 168b, 168c, 168d and 168e, which enter the recess 162 through the lower surface 158 and connect with the corresponding nipple-shaped terminal ports 30a–30e, previously described. Hollows are molded into the body member 42 between the individual terminal ports 30a–30e and the corresponding passages 168a–168e.

FIG. 79 is an assembly view, similar to FIG. 12, but showing the manifold member mounted in the recess 162. The bottom side 170 of the manifold member 160 is shown in FIG. 79. The bottom side 170 affords springiness or resilience for the manifold member 160, but the active, vacuum distribution components of the manifold member 160 are on the upper side 172 which is shown in FIG. 71. The bottom side 170 may be a mirror image of the upper side 172, at least approximately.

The upper side 172 of the manifold member 160 is provided with a system or maze of vacuum distribution passages 174, bounded by a system or array of ridges or fins 176, projecting upwardly from the upper side 172 and pressed into sealing engagement with the lower surface 158 of the port member 96. The passages 174 and the ridges 176 are arranged in accordance with a program, whereby the passages 174 communicate with the valve passages 132, and also with the five passages 168a–168e, leading to the nipple shaped terminal ports 30a–30e. The passages 174 afford the desired distribution of vacuum, to and from the valve ports 132, so that the valve members 128 on the push button carriages 40 can accomplish the desired program of valving functions, as previously described. A variety of programs can be employed by varying the arrangement of the vacuum distribution passages 174. By concentrating the valve distribution passages 174 on the upper side 172 of the manifold member 160, it is possible to provide modified valving programs for the control device 10 by providing a modified manifold member.

As previously indicated, the bottom side 170 of the manifold member 160 is provided with a system of downwardly projecting ridges 178 which afford springiness or resilience. The downwardly projecting ridges 178 are engaged and pressed upwardly by the lower cover 54 of the housing 12 for the control device 10. The ridges 178 act as boundaries for a system of passages 180. In this case, the ridges 178 and the passages 180 are not employed to distribute vacuum, but rather are employed to provide a resilient spring action, when pressed upwardly, as just described.

It will be seen from FIG. 14, for example, that all of the valve members 128 on all of the push buttons 18 cooperate with valve ports 132 in the port member 96, with the exception of the valve member 128 for the defrost push button 18g, as to which the port member 96 is not provided with any of the ports 132, so that the defrost push button 18g does not perform any valving function. However, a valve member 128 is nevertheless mounted on the carriage member 40 for the defrost push button 18g, to provide the same sliding friction between the valve member 128 and the port member 96, so that the operating feel of the defrost push button 18g will be the same as that of all of the other push buttons 18a –18f. In certain modifications, the valve member 128 for the defrost push button 18g could be provided with an array of valve ports 132.

As previously indicated, the OFF push button 18a is provided with a modified push button shaft 34a having a modified carriage 40a which is adapted to carry and operate a modified switching mechanism 182 having an abrupt snap action. Such modified switching mechanism 182 is illustrated, for example, in FIGS. 80–96. The modified push button shaft 34a and its modified carriage member 40a are illustrated in detail in FIGS. 52–59. The modified switching mechanism 182 is directly operated by the OFF push button 18a and is an improvement over the construction disclosed and claimed in the copending U.S. patent application of John G. Cummings, Ser. No. 116,060, filed Oct. 22, 1987, now U.S. Pat. No. 4,816,629, as a division of the Cummings U.S. patent application Ser. No. 930,000, filed Nov. 10, 1986, now U.S. Pat. No. 4,720,612, patented Jan. 19, 1988.

As shown in FIGS. 82 and 83, for example, the movement of the push button carriage 40a causes abrupt rocking movement of a contactor member, shown as a contactor plate 184, between an ON position, shown in FIG. 82, when the push button 18a is extended, and an OFF position, shown in FIG. 83, when the push button 18a is depressed. The contactor plate 184 is rockably carried by a fulcrum member 186, shown as a plate-like member having the generally T-shaped configuration shown in FIG. 84. The fulcrum member is spring mounted on the carriage member 40a and is slidable vertically relative thereto, while being movable horizontally therewith. As shown in FIGS. 82–89, the fulcrum member 186 is slidable vertically in a slot 188 formed in a resinous plastic or other electrically insulating insert block 190, mounted in an upwardly facing recess 192 formed in the carriage member 40a and detained in the recess 192 by a latching pawl or element 194. The fulcrum member 186 is freely slidable in the slot 188 throughout the operational range of the fulcrum member, but is detained in the slot 188, against easy exiting therefrom, by a pair of detent projections 196, projecting into the slot 188 from its opposite side walls, and slidable along a detent slot 198, formed in the plate-like fulcrum member 186. When the fulcrum member 186 is inserted initially into the vertical slot 188, a detent bar 200, at the lower end of the fulcrum member 186, is pushed past the detent projections 196, which yield due to the resilient flexibility of the insert block 190. The detent projections 196 then snap into the detent slot 198 and are freely slidable therealong.

The fulcrum member 186 is spring mounted on the carriage member 40a by spring means, shown as a single compression coil spring 202, received in an annular slot or spring nest 204, formed in the insert block 190 and opening upwardly therefrom. The coil spring 202 is compressed between the insert block 190 and a pair of laterally projecting arms 206, formed on the plate-like fulcrum member 186. The spring 202 provides a continuous upward spring biasing force on the fulcrum member 186.

The arms 206 on the fulcrum member 186 have upper edges 208 which provide the desired fulcrum for the contactor plate 184 and are engageable with the lower side thereof. The contactor plate 184 is located and retained on the fulcrum member 186 by lug means thereon, shown as a lug 210, projecting upwardly above the arms 206, through a loosely fitting clearance slot 212 in the contactor plate. The loosely fitting slot 212 makes it possible for the contactor plate 184 to rock freely on the fulcrum member 186. The coil spring 202 provides a continuous upward spring biasing force on the contactor plate 184 as the push button carriage 40a is moved between its extended or ON position of FIG. 82, and its depressed or OFF position of FIG. 83.

The contactor plate 184 cooperates with first and second fixed contact members 214 and 216, shown in FIGS. 82 and 83, for example, as electrically conductive bars, mounted on the resinous plastic or other electrically insulating upper cover 127 of the housing 12 for the control device 10. The first and second contact members 214 and 216 are disposed along the path of movement of the contactor plate 184.

The first fixed contact member 214 has rider means for riding along the upper surface of the contactor plate 184, between locations thereon on opposite sides of the fulcrum member 186, to produce rocking movement of the contactor plate 184 when the carriage member 40a is moved between the extremes of its range of movement, as shown in FIGS. 82 and 83. The rider means are shown as comprising a pair of flanges or tabs 218, formed on and projecting downwardly from the first fixed contact member 214. The rider tabs 218 are spaced apart laterally, to straddle the lug 210 on the fulcrum member 186.

The rocking movement of the contactor plate 184 occurs abruptly when the vertical center plane of the fulcrum member 186 passes the vertical center plane of the rider tabs 218. When the carriage 40a is moved to its ON position, as shown in FIG. 82, the contactor plate 184 is rocked so that a contactor point 220 thereon engages the second fixed contact member 216, whereby the contactor plate 184 establishes a bridging electrical connection between the first and second fixed contact members 214 and 216. When the carriage 40a is moved to its OFF position, as shown in FIG. 83, the contactor plate 184 is abruptly rocked out of engagement with the second fixed contact member 216. The illustrated contactor plate 184 has a stop point 222 which then engages the first fixed contact member 214, as shown in FIG. 83. The stop point 222 limits the rocking movement of the contactor plate 184 by engaging the first fixed contact member 214, as shown in FIG. 83. The stop point 222 is also adapted to ride smoothly along the first fixed contact member 214 until it is rocked to its ON position, as shown in FIG. 82. However, the stop point 222 is not relied upon to establish any electrical contact with the first fixed contact member 214, because the contactor plate 184 continuously engages the electrically conductive rider tabs 218 on the contact member 214. The making and breaking of the electrical circuit is accomplished by the abrupt movements of the contactor point 220, into and out of engagement with the second fixed contact member 216.

A locating tab 224 projects upwardly from the insert block 190 on the carriage member 40a and is adapted to be received by a cutout or notch 226, formed in the contactor plate 184. The notch 226 affords adequate clearance between the contactor plate 184 and the locating tab 224, which ensures that the contactor plate 184 is assembled on the fulcrum member 186 with the proper orientation.

The coil spring 202 exerts a continuous spring force between the contactor plate 184 and the rider tabs 218 of the first fixed contact member 214. In addition to biasing the contactor plate 184 upwardly, the spring 202 exerts a downward force on the carriage member 40a, and such force is exerted upon the corresponding vacuum valve member 128, mounted on the lower side of the carriage member 40a, so that the valve member 128 is pressed into sealing engagement with the upper surface 130 of the port plate 96, in which the valve ports 132 are formed. Thus, the spring 202 performs the dual functions of providing electrical contact pressure, between the contactor 184 and the fixed contacts 214 and 216, while also providing valve sealing pressure between the valve member 128 and the valve surface 130.

As previously indicated, the six push buttons 18b-18g, other than the OFF push button 18a, are all provided with the illustrated electrical contactors 98, of the construction shown in FIGS. 60-62, 77, 78 and 97-100, as previously described, but the arrangement is such that only some of the contactors 98 are capable of making and breaking the electrical circuit between the first and second fixed contact members or bars 118 and 120. Such electrical circuit energizes the air conditioning clutch, in this instance. The other contactors 98 do not make or break any electrical circuit, but are provided, along with their contactor biasing springs 114, to produce the same operating feel or friction for all of the push buttons 18, and to provide sealing force between each valve member 128 and the port member 96. To make the differentiation between those contactors 98 which can make or close an electrical circuit and those contactors 98 which cannot, the second fixed electrical contact member or bar 120 is made with a special construction, as shown to good advantage in FIG. 74, for example. Thus, the contact bar 120 is provided with a plurality of contact tabs or tongues 228, in the same plane as the main body 230 of the contact bar 120 and projecting toward the first contact bar 118. Each of the contact tabs 228 is provided along the path of each of the contactors 98 which is adapted to make an electrical circuit. When the corresponding push button 18 is depressed, the corresponding second contactor point 106 of the corresponding contactor 98 slides into electrical contact with the corresponding contact tab 228, while the first contactor point 104 slides in contact with the first contact bar 118. Insulating bosses 232 are provided on the resinous plastic or other insulating cover 127, between the first contact bar 118 and the respective tabs 228. When each of the corresponding push buttons is moved to its extended position, the corresponding contactor point 106 slides from the corresponding contact tab 228 to the corresponding insulating boss 232, with a smooth sliding action, so as to break the electrical circuit between the fixed contact bars 118 and 120.

Figure 2:
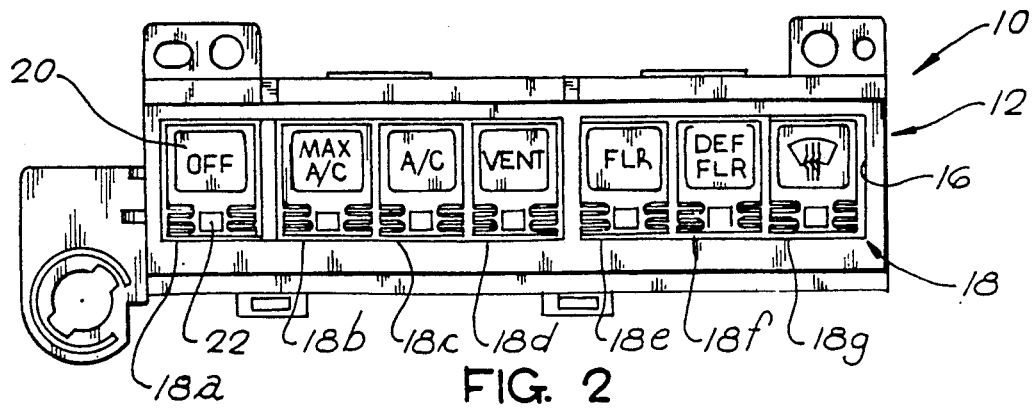
FIG. 2 is a front elevation of the control device, showing the front layout of the push buttons.

As to each of the push buttons 18b-18g which is not adapted to close any electrical circuit, the second fixed contact bar 120 is not provided with any such contact tab 228, but rather is provided with a notch or cutout 234, two of which are illustrated in FIG. 74. Two larger insulating bosses 236 are provided on the insulating cover 127 between the first contact bar 118 and the corresponding notches 234, so that the corresponding contactor points 106 will slide along the insulating bosses 236, throughout the range of movement of the corresponding push buttons 18, between their extended and depressed positions. Accordingly, where the notches 234 are provided in the second contact bar 120, the corresponding push buttons 18 are not adapted to make any electrical connection between the first and second fixed contact bars 118 and 120, or to perform any other electrical switching function. When either of these push buttons is depressed, the air conditioning clutch is not energized. This mode of operation applies to the fourth and fifth push buttons 18d and 18e, marked VENT and FLR, as shown in FIG. 2.

Four of the contact tabs 228 are provided so that the air conditioning clutch is energized when the second, third, sixth and seventh push buttons 18b, 18c, 18f and 18g are depressed. Such push buttons have the markings MAX A/C, A/C, DEF FLR, and the defrost symbol, as shown in FIG. 2.

I claim:

1. An electrical switch, comprising
switch body means,
an electrically insulating switch carriage,
operating means for moving said switch carriage along a predetermined path on said body means,
fixed electrical contact means mounted on said body means along said predetermined path,
an electrically conductive contactor mounted on said carriage for selectively engaging said fixed contact means,
said contactor taking the form of an angle-shaped plate consisting of first and second flanges with a generally rectangular relationship therebetween,
said first flange having portions thereof slidably engageable with said fixed contact means,
said carriage having a guide slot therein for slidably receiving said second flange for sliding movement of said contactor toward said fixed contact means,
said second flange and said guide slot constituting the sole guiding and supporting means for said contactor,
and a compression spring compressed between said carriage and said first flange of said contactor for biasing said first flange toward said fixed contact means and for producing spring contact pressure between said first flange and said fixed contact means.

2. An electrical switch according to claim 1,
in which said second flange and said guide slot extend in a direction which is substantially parallel with the direction of said predetermined path of said carriage.

3. An electrical switch according to claim 2,
in which said first and second flanges have substantially the same length along the direction of said path.

4. An electrical switch according to claim 2,
in which said portions of said first flange take the form of a pair of rounded contactor points projecting from said first flange toward said fixed contact means and slidably engageable therewith,
said first flange being otherwise substantially flat.

5. An electrical switch according to claim 4,
in which said contactor points are spaced apart along the direction of said path.

6. An electrical switch according to claim 2,
in which said second flange of said contactor has a detent point projecting laterally therefrom, said guide slot having a side wall formed with a guiding channel for receiving and guiding said detent point, said guiding channel extending substantially perpendicular to the direction of said path, said side wall having a detent bar formation obstructing the entry of said detent point into said guiding channel while also obstructing the exit of said detent point out of said guiding channel for detaining said detent point in said guiding channel, said side wall and said detent bar formation being flexible and resilient to provide for entry of said detent point into said guiding channel.

7. An electrical switch according to claim 1, in which said second flange of said contactor has a detent point projecting laterally therefrom, said guide slot having a side wall formed with a guiding channel for receiving and guiding said detent point, said guiding channel extending substantially perpendicular to the direction of said path, said side wall having a detent bar formation obstructing the entry of said detent point into said guiding channel while also obstructing the exit of said detent point out of said guiding channel for detaining said detent point in said guiding channel, said side wall and said detent bar formation being flexible and resilient to provide for entry of said detent point into said guiding channel.

8. An electrical switch according to claim 1, in which said contactor points are spaced apart along the direction of said path.

9. An electrical switch, comprising switch body means, an electrically insulating switch carriage, operating means for moving said switch carriage along a predetermined path on said body means, fixed electrical contact means mounted on said body means along said predetermined path, an electrically conductive contactor mounted on said carriage for selectively engaging said fixed contact means, said contactor taking the form of an angle-shaped plate consisting of first and second flanges with a generally rectangular relationship therebetween, said first flange having portions thereof slidably engageable with said fixed contact means, said carriage having a guide slot therein for slidably receiving said second flange for sliding movement of said contactor toward said fixed contact means, said second flange and said guide slot constituting the sole guiding and supporting means for said contactor, and a compression spring compressed between said carriage and said first flange of said contactor for biasing said first flange toward said fixed contact means and for producing spring contact pressure between said first flange and said fixed contact means, said portions of said first flange being in the form of a plurality of rounded contactor points projecting from said first flange toward said fixed contact means and slidably engageable therewith, said first flange being otherwise substantially flat.

10. An electrical switch according to claim 9, in which said first and second flanges and said guide slot have longitudinal dimensions which extend in a direction which is substantially parallel with the direction of said predetermined path of said carriage.

11. An electrical switch according to claim 10, in which said first and second flanges have substantially the same length along the direction of said path.

12. An electrical switch according to claim 9, in which said contactor points comprise a pair of said points which are spaced apart along the direction of said path.

* * * * *